(12) United States Patent
Yun

(10) Patent No.: US 9,699,286 B2
(45) Date of Patent: Jul. 4, 2017

(54) MOBILE TERMINAL AND METHOD OF CONTROLLING MOBILE TERMINAL TO DISPLAY IMAGE UPON RECEIVING PROXIMITY TOUCH INPUT

(75) Inventor: Yeerang Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 501 days.

(21) Appl. No.: 13/029,070

(22) Filed: Feb. 16, 2011

(65) Prior Publication Data

US 2012/0084691 A1    Apr. 5, 2012

(30) Foreign Application Priority Data

Sep. 30, 2010    (KR) ........................ 10-2010-0095071

(51) Int. Cl.
*H04M 1/725* (2006.01)
*G06F 3/0484* (2013.01)
(Continued)

(52) U.S. Cl.
CPC ...... *H04M 1/72519* (2013.01); *G06F 3/0483* (2013.01); *G06F 3/0488* (2013.01); *G06F 3/04842* (2013.01); *G06F 3/04883* (2013.01); *G06F 3/04886* (2013.01); *H04M 1/67* (2013.01); *H04M 1/673* (2013.01);
(Continued)

(58) Field of Classification Search
CPC ...... G06F 3/048; G06F 3/0481; G06F 3/0482; G06F 3/0487; G06F 3/0488; G06F 3/04886; G06F 9/4443; G06F 2212/171; G06F 3/017; G06F 3/04842; G06F 3/04817; G06F 3/04847; G06F 2203/04108; G06F 2203/04101; H04M 1/72552; H04M 1/72583; H04M 1/274508; H04M 1/274533; H04M 1/67; G01C 21/3664
USPC ............... 715/769, 781, 835, 863, 864, 806; 711/165
See application file for complete search history.

(56) References Cited

U.S. PATENT DOCUMENTS 7,155,729 B1 *  12/2006  Andrew et al. ............... 719/318
7,657,849 B2 *   2/2010  Chaudhri et al. ............. 715/863
(Continued)

FOREIGN PATENT DOCUMENTS

CN   101482795   7/2009
CN   101611373   12/2009
(Continued)

OTHER PUBLICATIONS

Android 2.2 User's Guide, Google, May 20, 2010.*
(Continued)

*Primary Examiner* — Nicholas Ulrich
(74) *Attorney, Agent, or Firm* — Lee Hong Degerman Kang & Waimey

(57) ABSTRACT

A mobile terminal and a method of controlling a mobile terminal are provided. According to one embodiment, a mobile terminal includes: a touch screen for displaying and receiving information; and a controller for: controlling the touch screen to display a lock screen upon the mobile terminal entering a lock screen state; and controlling the touch screen to display a preview image of each of at least one application executed before entering the lock screen state upon receiving a proximity touch input on the displayed lock screen.

4 Claims, 36 Drawing Sheets

(51) Int. Cl.
   *G06F 3/0483* (2013.01)
   *G06F 3/0488* (2013.01)
   *H04M 1/67* (2006.01)
   *H04M 1/673* (2006.01)

(52) U.S. Cl.
   CPC .... *H04M 1/72583* (2013.01); *H04M 2250/22* (2013.01); *H04M 2250/60* (2013.01)

(56) References Cited

U.S. PATENT DOCUMENTS

| | | | |
|---|---|---|---|
| 7,673,255 B2* | 3/2010 | Schechter et al. | 715/838 |
| 7,793,225 B2* | 9/2010 | Anzures et al. | 715/772 |
| 8,136,053 B1* | 3/2012 | Miller et al. | 715/863 |
| 8,370,762 B2* | 2/2013 | Abbott | 715/769 |
| 8,418,086 B2* | 4/2013 | Weber et al. | 715/864 |
| 8,434,153 B2* | 4/2013 | Sundaramurthy et al. | 726/26 |
| 8,539,382 B2* | 9/2013 | Lyon et al. | 715/863 |
| 2006/0161871 A1* | 7/2006 | Hotelling ............ G06F 3/0485 | 715/863 |
| 2007/0220441 A1* | 9/2007 | Melton et al. | 715/781 |
| 2008/0086703 A1* | 4/2008 | Flynt ............ G06F 3/0482 | 715/853 |
| 2008/0168403 A1* | 7/2008 | Westerman et al. | 715/863 |
| 2008/0220752 A1* | 9/2008 | Forstall ............ H04M 1/56 | 455/415 |
| 2008/0307452 A1* | 12/2008 | Kim et al. | 725/32 |
| 2009/0106698 A1* | 4/2009 | Hansen et al. | 715/838 |
| 2009/0224874 A1* | 9/2009 | Dewar et al. | 340/5.53 |
| 2009/0237372 A1* | 9/2009 | Kim ............ G06F 3/044 | 345/173 |
| 2009/0239588 A1* | 9/2009 | Nam ............ G06F 1/1624 | 455/566 |
| 2009/0259968 A1* | 10/2009 | Hsieh et al. | 715/808 |
| 2010/0031169 A1* | 2/2010 | Jang et al. | 715/760 |
| 2010/0060475 A1 | 3/2010 | Choi | |
| 2010/0127998 A1* | 5/2010 | Hyun | 345/173 |
| 2010/0138763 A1* | 6/2010 | Kim | 715/765 |
| 2010/0146235 A1 | 6/2010 | Weber et al. | |
| 2010/0146384 A1* | 6/2010 | Peev ............ H04M 1/673 | 715/255 |
| 2010/0146437 A1* | 6/2010 | Woodcock et al. | 715/806 |
| 2010/0159995 A1* | 6/2010 | Stallings ............ G06F 3/0488 | 455/566 |
| 2010/0162182 A1* | 6/2010 | Oh et al. | 715/863 |
| 2010/0299599 A1* | 11/2010 | Shin ............ G06F 3/0482 | 715/702 |
| 2010/0306705 A1* | 12/2010 | Nilsson | 715/835 |
| 2010/0306718 A1* | 12/2010 | Shim et al. | 715/863 |
| 2011/0047368 A1* | 2/2011 | Sundaramurthy ....G06F 3/0481 | 713/100 |
| 2011/0072400 A1* | 3/2011 | Watanabe et al. | 715/863 |
| 2011/0138313 A1* | 6/2011 | Decker et al. | 715/777 |
| 2011/0161852 A1* | 6/2011 | Vainio et al. | 715/769 |
| 2012/0042257 A1* | 2/2012 | Aftab ............ G06F 1/1694 | 715/738 |
| 2012/0053887 A1* | 3/2012 | Nurmi ............ G06F 3/0485 | 702/150 |
| 2013/0174120 A1* | 7/2013 | Kalaidjian ............ G06F 9/44 | 717/113 |

FOREIGN PATENT DOCUMENTS

| | | |
|---|---|---|
| EP | 2104019 | 9/2009 |
| EP | 2148497 | 1/2010 |
| JP | 2010-516022 | 5/2010 |
| KR | 10-2009-0100933 | 9/2009 |

OTHER PUBLICATIONS

Google Inc, "Android 2.2 User's Guide," XP007918504, May 2010, 336 pages.
European Patent Office Application Serial No. 11167178.0, Search Report dated Jul. 7, 2014, 9 pages.
European Patent Office Application Serial No. 15194525.0, Search Report dated Apr. 26, 2016, 9 pages.

\* cited by examiner

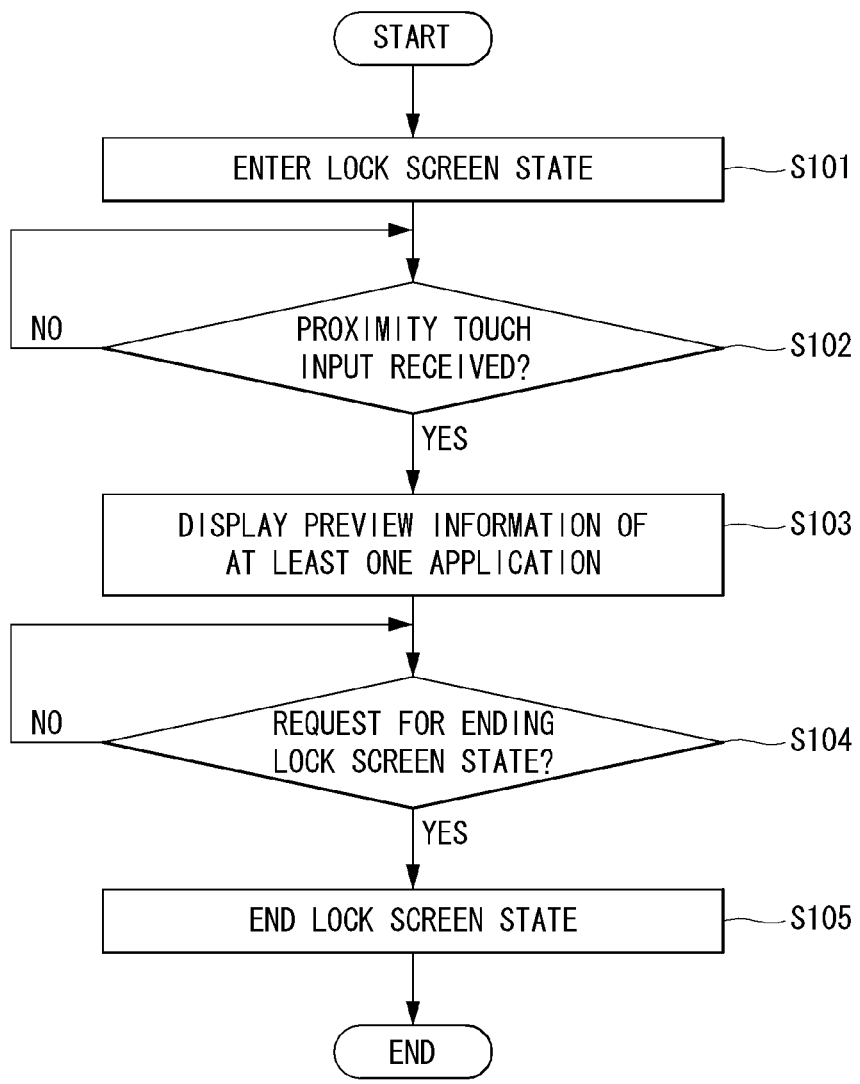

FIG. 17A
FIG. 17B
FIG. 17D
FIG. 17C
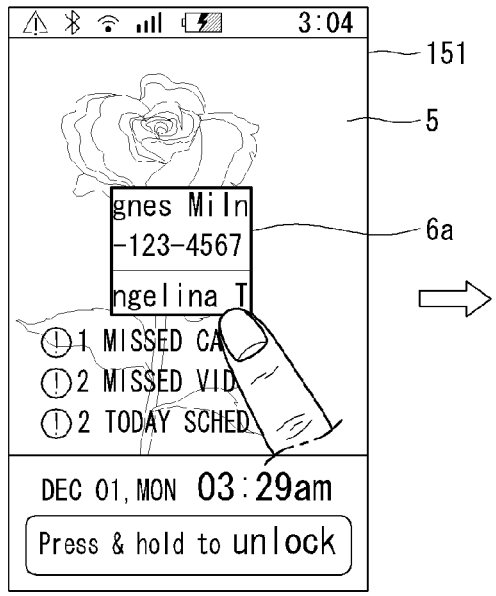
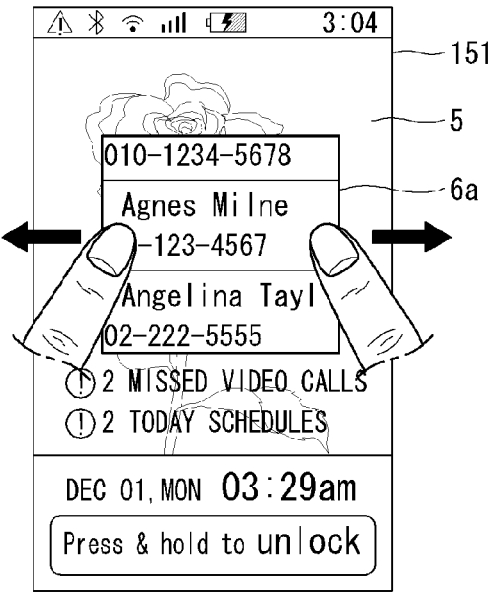
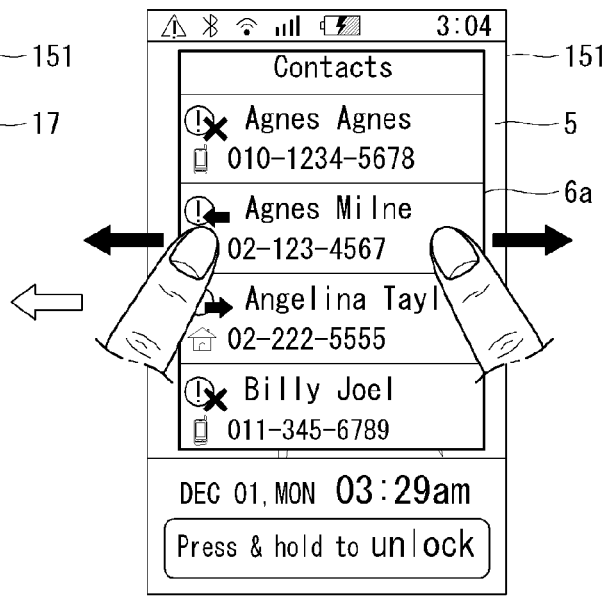

28a

28b

MOBILE TERMINAL AND METHOD OF CONTROLLING MOBILE TERMINAL TO DISPLAY IMAGE UPON RECEIVING PROXIMITY TOUCH INPUT

This application claims the benefit of earlier filing date and right of priority to Korean Patent Application No. 10-2010-0095071 filed on Sep. 30, 2010, the entire contents of which are hereby incorporated by reference.

Field of the Invention

Embodiments of the present invention relate to a mobile terminal and a method of controlling a mobile terminal.

Related Art

Terminals can be divided into mobile terminals and stationary terminals. The mobile terminals can be classified as handheld terminals or vehicle mounted terminals according to whether users can personally carry the terminals.

In view of various types of services that are provided by mobile terminals, an improvement in the structure and/or software of mobile terminals is considered.

SUMMARY

Embodiments of the present invention relate to a mobile terminal and a method of controlling a mobile terminal, and more particularly to a mobile terminal (and a method of controlling a mobile terminal) for allowing a user to check required preview information and history information without influence over a current state of the mobile terminal such that user convenience may be enhanced.

According to one embodiment, a mobile terminal includes: a touch screen for displaying and receiving information; and a controller for: controlling the touch screen to display a lock screen upon the mobile terminal entering a lock screen state; and controlling the touch screen to display a preview image of each of at least one application executed before entering the lock screen state upon receiving a proximity touch input on the displayed lock screen.

According to one embodiment, a mobile terminal includes: a touch screen for displaying and receiving information; and a controller for controlling the touch screen to display history information or preview information corresponding to a specific region of the touch screen upon receiving a proximity touch input of the specific region.

According to one embodiment, a method of controlling a mobile terminal includes: controlling a touch screen to display a lock screen upon the mobile terminal entering a lock screen state; receiving a proximity touch input via the displayed lock screen; and controlling the touch screen to display a preview image of at least one application executed before entering the lock screen state on the displayed lock screen.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIG. 5 is a flowchart illustrating a method of controlling a mobile terminal according to an embodiment of the present invention;

FIGS. 13 to 18 are views of screen displays illustrating examples of ending the lock screen when preview images of an application are displayed on a locked screen;

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
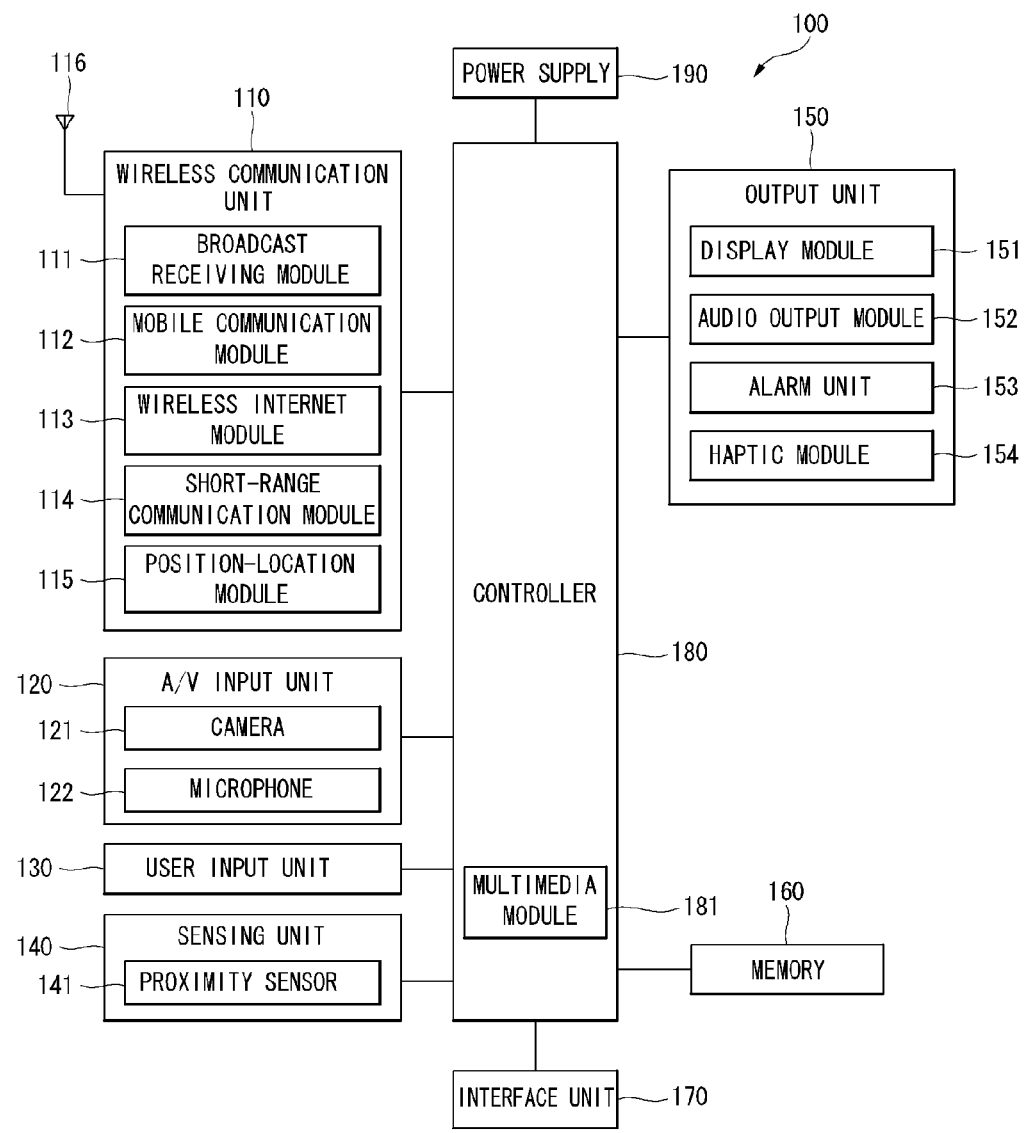
FIG. 1 is a block diagram illustrating a configuration of a mobile terminal according to embodiments of the present invention.

FIG. 1 is a block diagram of a mobile terminal 100 according to an embodiment of the present invention. It is understood that other embodiments, configurations and arrangements may also be provided. With reference to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or ZigBee™ may be used as a local area communication technique.

The position-location module 115 may confirm or obtain the position of the mobile terminal 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures obtained by an image sensor in a video call mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100. For example, if the mobile terminal 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of the mobile terminal 100.

The mobile terminal 100 may also include at least two display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the mobile terminal 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. Meanwhile, a capacitive touch screen may be constructed such that proximity of a pointer is detected through a variation in an electric field according to the proximity of the pointer. Therefore, the touch screen (touch sensor) may be considered as a proximity sensor 141 if the touch screen is implemented as the capacitive touch screen.

For the convenience of description, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images.

The power supply 190 may receive external power and internal power and provide power required for operating the components of the mobile terminal 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
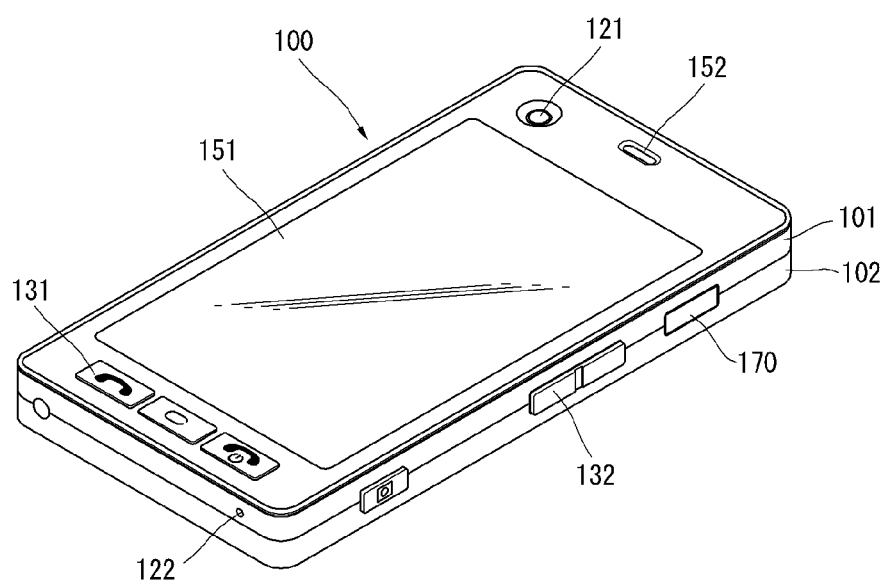
FIGS. 2 and 3 are perspective views of a mobile terminal according to embodiments of the present invention.

FIG. 2 is a front perspective view of a mobile terminal or a handheld terminal 100 according to an embodiment of the present invention. The handheld terminal 100 has a bar type terminal body. However, embodiments of the present invention are not limited to a bar type terminal and may include various types of terminals such as slide type, folder type, swing type and swivel type terminals having at least two bodies coupled such that they can move relative to each other.

The terminal body includes a case (a casing, a housing, or a cover) forming the exterior of the terminal 100. In the embodiment of FIG. 2, the case may be divided into a front case 101 and a rear case 102. Various electronic components are arranged in the space (volume) defined between the front case 101 and the rear case 102. At least one middle case may be additionally arranged between the front case 101 and the rear case 102. The cases may be made of plastics through injection molding or made of a metal material such as stainless steel (STS) or titanium (Ti).

The display module 151, the audio output module 152, the camera 121, user input unit 130 (e.g., operating units 131, 132), the microphone 122 and the interface unit 170 may be arranged in the terminal body, specifically, in the front case 101.

The display module 151 occupies a majority of the area of the main face of the front case 101. The audio output module 152 and the camera 121 are arranged in a region in proximity to an end of the display module 151, and the operating unit 131 and the microphone 122 are located in a region in proximity to the other end of the display module 151. The operating unit 132 and the interface unit 170 are arranged on the lateral sides of the front case 101 and the rear case 102.

The user input unit 130 is operated to receive commands controlling the handheld terminal 100 and may include a plurality of operating units 131 and 132. The first and second operating units 131 and 132 may be referred to as manipulating portions and may employ a tactile mechanism by which a user operates the operating units 131 and 132 by touch.

The first and second operating units 131 and 132 may receive various inputs. For example, the first operating unit 131 receives commands such as 'START,' 'END,' and 'SCROLL,' and the second operating unit 132 receives commands such as 'CONTROL' (the volume of sound output from the audio output module 152) or 'CONVERT' (a mode of the display module 151 into a touch recognition mode).

Figure 3:
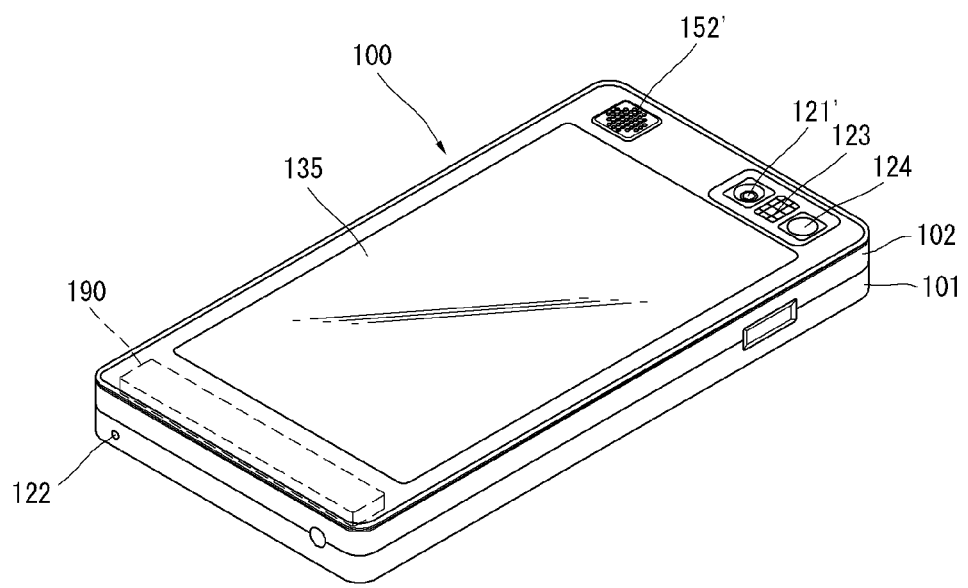

FIG. 3 is a rear perspective view of the handheld terminal shown in FIG. 2 according to an embodiment of the present invention.

Referring to FIG. 3, a camera 121' may be additionally mounted at the rear side of the terminal body, that is, the rear case 102. The camera 121' captures images along a direction opposite to that of the camera 121 shown in FIG. 2 and may have a pixel resolution different from that of the camera 121.

For example, according to one embodiment, the camera 121 has a relatively low resolution suitable for capturing an image of the face of a user and transmitting the captured image in a video call, while the camera 121' has a relatively high resolution suitable for capturing a photograph of a general subject. The cameras 121 and 121' may be mounted to the terminal body such that they may be rotated or popped-up.

A flash 123 and a mirror 124 may be additionally arranged in proximity to the camera 121'. The flash 123 lights a subject when the camera 121' takes a picture of the subject. The mirror 124 may be used by the user to view his/her face when the user wants to self-photograph himself/herself using the camera 121'.

An audio output module 152' may be additionally provided on the rear side of the terminal body. The audio output module 152' may facilitate a stereo function in conjunction with the audio output module 152 shown in FIG. 2 and may be used in a speaker phone mode when the terminal is used for a voice call.

A broadcasting signal receiving antenna 116 may be additionally attached to the side of the terminal body in addition to an antenna for voice calls. The antenna, which may constitute a part of the broadcast receiving module 111 shown in FIG. 1, may be mounted in the terminal body such that the antenna may be pulled out from (and retracted into) the terminal body.

The power supply 190 for providing power to the handheld terminal 100 is set in the terminal body. The power supply 190 may be provided in the terminal body or detachably installed on the terminal body.

A touch pad 135 for sensing a touch may be additionally attached to the rear case 102. The touch pad 135 may be of a light transmission type similar to the display module 151. In this configuration, if the display module 151 outputs visual information through both of its sides (or faces), the visual information may be viewable via the touch pad 135. The information output through both sides of the display unit 151 may be controlled by the touch pad 135. Alternatively (or in addition), a display is additionally attached to the touch pad 135 such that a touch screen may be arranged in the rear case 102.

The touch pad 135 operates in connection with the display module 151 of the front case 101. The touch pad 135 may extend parallel to the display module 151 behind the display module 151. The touch panel 135 may have a size equal to or smaller than the size of the display module 151.

Figure 4:
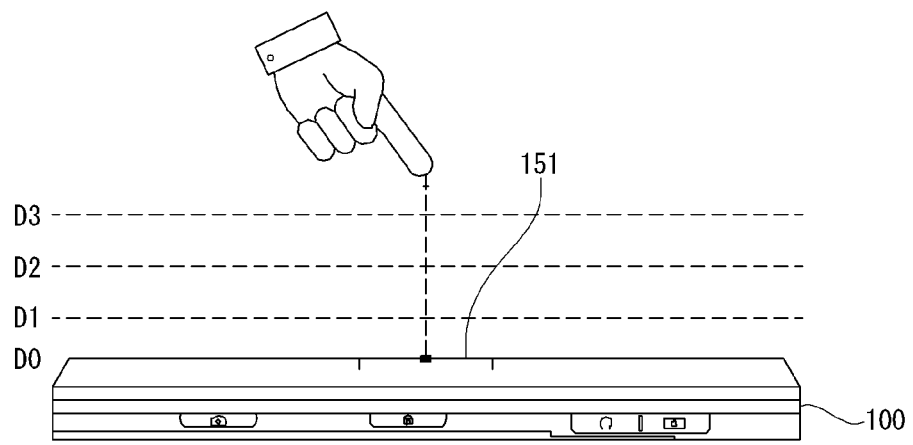
FIG. 4 is a conceptual diagram for illustrating a proximity depth of a proximity sensor.

FIG. 4 is a conceptual diagram for explaining a proximity depth of the proximity sensor. Referring to FIG. 4, when a pointer such as a user's finger approaches the touch screen 151, the proximity sensor located inside or near the touch screen senses the approach and outputs a proximity signal. The proximity sensor may be configured to output a proximity signal according to the distance between the pointer approaching the touch screen and the touch screen (referred to as a "proximity depth").

The distance, according to which the proximity signal is output when the pointer approaches the touch screen, is referred to as a detection distance. The proximity depth may be detected by using a plurality of proximity sensors having different detection distances and by comparing respective proximity signals output from the proximity sensors. Referring to FIG. 4, proximity sensors for sensing three proximity depths are arranged in a section of the touch screen. Alternatively, proximity sensors suitable for sensing less than three proximity depths or more than four proximity depths may be arranged in the touch screen.

Referring to FIG. 4, when the pointer comes into contact (e.g., complete contact) with the touch screen (distance of D0), it is recognized as a contact touch. When the pointer is located within a distance D1 from the touch screen, it is recognized as a proximity touch of a first proximity depth. When the pointer is located in a range between the distance D1 and a distance D2 from the touch screen, it is recognized as a proximity touch of a second proximity depth. When the pointer is located in a range between the distance D2 and a distance D3 from the touch screen, it is recognized as a proximity touch of a third proximity depth. When the pointer is located at a position further than the distance D3 from the touch screen, no proximity touch or a cancellation (e.g., termination) of a proximity touch is recognized.

Accordingly, the controller 180 may recognize the proximity touch as various input signals according to the proximity distance and the proximity position of the pointer with respect to the touch screen. The controller 180 may perform various control operations according to the input signals.

Embodiments of the present invention may be implemented in the mobile terminal(s) 100 described with reference to FIGS. 1 to 4. Hereinafter, a method of controlling the mobile terminal 100 according to embodiments of the present invention and operation of the mobile terminal 100 performing the method will be described in more detail with reference to FIGS. 5 to 18.

FIG. 5 is a flowchart of a method of controlling the mobile terminal 100 according to an embodiment of the present invention. FIGS. 6 to 18 are views of display screens illustrating the method of controlling the mobile terminal 100 according to embodiments of the present invention.

Referring to FIG. 5, the controller 180 enters a lock screen state and displays a lock screen on the touch screen 151 indicating that the mobile terminal 100 has entered the lock screen state (S101). The lock screen function is for preventing the mobile terminal 100 from being operated when an undesired touch input occurs on the touch screen 151. According to an embodiment of the present invention, the controller 180 performs a function corresponding to a specific touch input in controlling the mobile terminal 100 to enter the lock screen state. For example, the controller 180 enters the lock screen state when the entry into the lock screen state is requested through the user input unit 130 or when a control input is not received over a predetermined time.

When the touch screen 151 is proximity-touched and the proximity touch input is received (S102), the controller 180 displays a preview image (or preview information) of at least one application on the touch screen 151 based on the received proximity touch input (S103). For example, the at least one application for which the preview image is displayed may be an application that was being executed before the mobile terminal 100 entered the lock screen state.

In the operation S102, the proximity touch input that triggers the display of the preview image of the at least one application in the lock screen state may be input (or generated in various manners as described below. FIGS. 6A, 6B, 7A, 7B and 7C are views of screen displays illustrating examples of the display of preview images of at least one application based on the proximity touch input, where the at least one application was being executed before entry into the lock screen state.

Figure 6A:
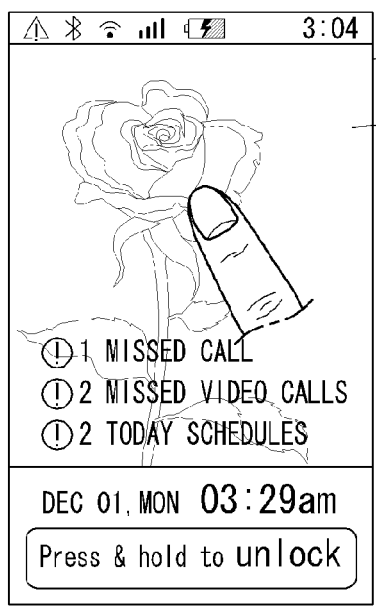
FIGS. 6 and 7 are views of screen displays for illustrating examples of displaying preview images of at least one application that was executed before entering a lock screen state based on a proximity touch input.

The controller 180 may display the preview image of the application when at least one point of the touch screen 151 is proximity-touched when the mobile terminal 100 is in the lock screen state. Referring to FIG. 6A, the controller 180 receives the proximity touch input through the touch screen on which a lock screen 5 is displayed.

Figure 6B:
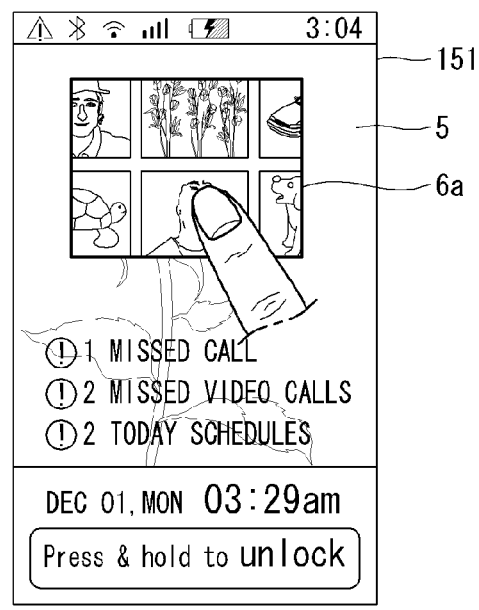

Referring to FIG. 6B, the controller 180 then displays a preview image 6a of an application, for example, of a gallery application that was being executed before the mobile terminal 100 entered the lock screen state. The controller 180 displays (or causes the touch screen 151 to display) the preview image 6a such that the preview image 6a overlaps with the lock screen 5 on a portion of the touch screen 151. That is, the preview image 6a is superimposed over the lock screen 5 on a portion of the touch screen. As illustrated in FIG. 6B, the preview image 6a includes an execution screen of the gallery application.

Figure 7A:
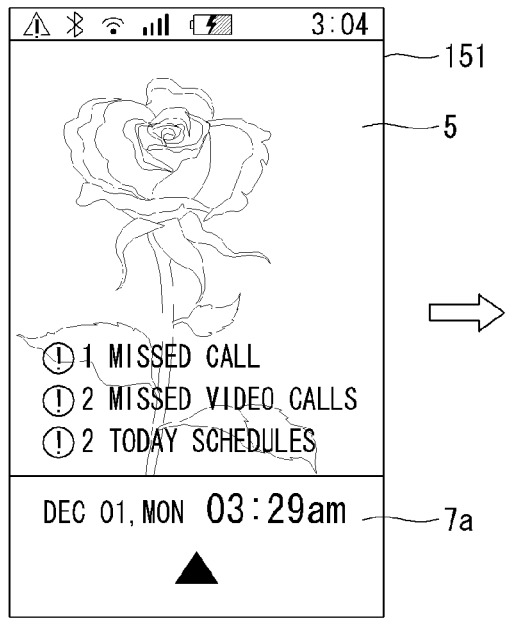
Figure 7B:
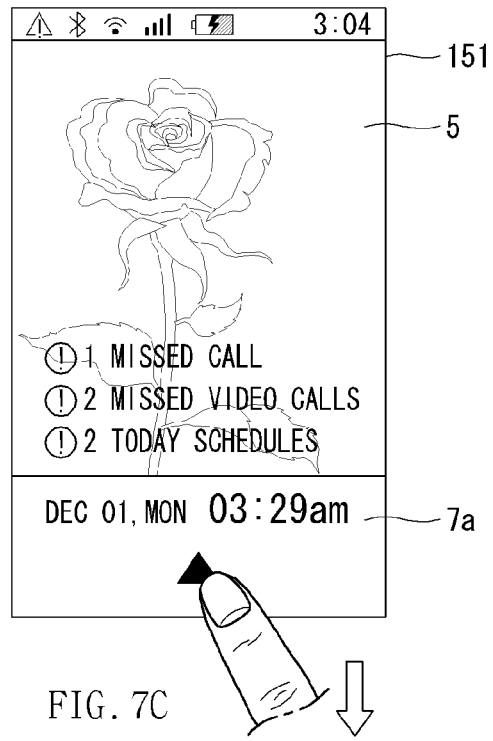

In addition, the controller 180 may display a preview image of an application on the touch screen 151 when a specific region of the touch screen 151 is selected and dragged by a proximity touch. Referring to FIG. 7A, the controller 180 displays a slide type lock release region 7a, which may be dragged on the lock screen 5. The lock release region 7a is for receiving a touch input for ending (or exiting) the lock screen state. Referring to FIG. 7B, the lock release region 7a is touched by a proximity touch.

Figure 7C:
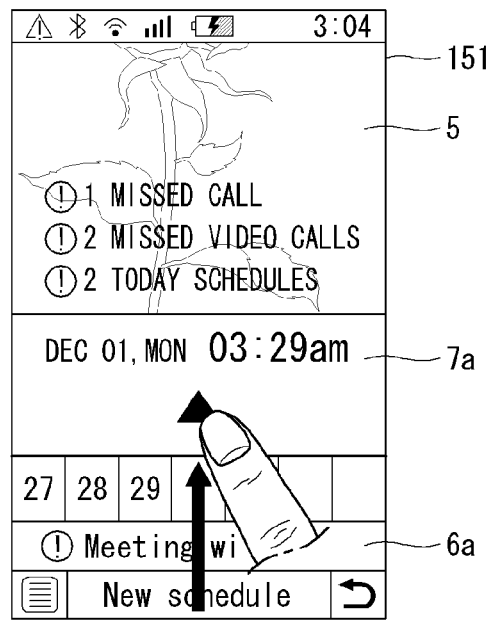

Referring to FIG. 7C, the controller 180 displays the preview image 6a of the application that was being executed before the lock screen state was entered when the lock release region 7a is dragged toward an upper end of the screen. In this situation, the controller 180 may steadily (e.g., incrementally) move the display of the lock release region 7a toward the upper end of the screen based on the drag path of the proximity touch. The controller 180 may display the preview image 6a at a location from which the lock release region 7a is dragged and moved as the display of the lock release region 7a is moved upwards. Further, the display region of the preview image 6a may be expanded as the lock release region 7a is further dragged toward the upper end of the screen.

For example, the controller 180 may increase a size of the execution screen of the application included in the preview image 6a as the display region of the preview image 6a is expanded. To this end, the controller 180 may match the display region of the preview image 6a to a region of the execution screen of the application and may display the region of the execution screen of the application that is matched to the display region of the preview image 6a in the preview image 6a. In addition, the controller 180 may expand (or enlarge) the displayed preview image 6a (relative to the initially displayed preview image 6a) as the display region of the preview image 6a is expanded.

In the operation of S103 (see FIG. 5), the controller 180 may generate a preview image of an application in various manners as will be described in more detail below. FIGS. 8 to 12 are views of screen displays illustrating examples of a preview image of an application that is displayed when the mobile terminal 100 is in the lock screen state.

The controller 180 may generate a preview image to include some region of the execution screen of the application. In more detail, when an entry into the lock screen state is requested, the controller 180 stores a final execution screen (e.g., a screen snapshot) of the application that is being executed in the memory 160. At least a portion of the final execution screen stored in the memory 160 may be used as a preview image of a corresponding application.

Figure 8:
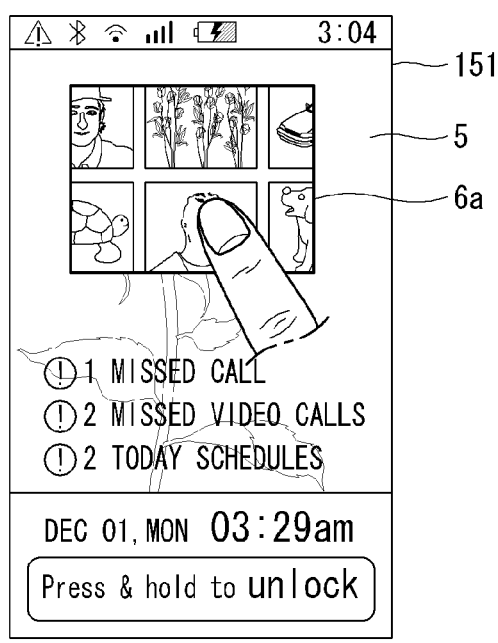
FIGS. 8 to 12 are views of screen displays illustrating examples of preview images of an application in the lock screen state.
Figure 9:
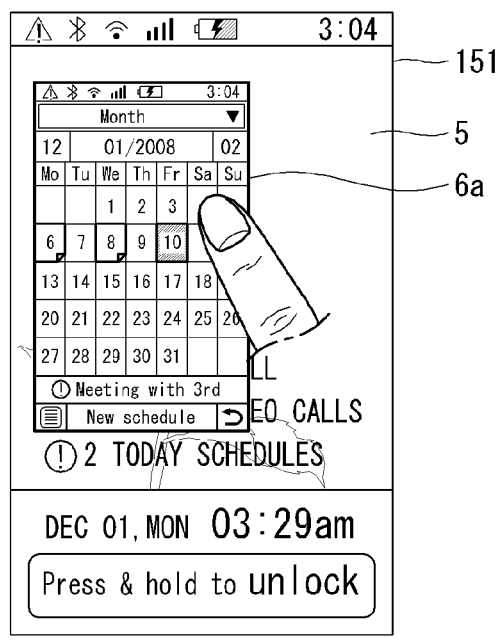

Referring to FIG. 8, when the mobile terminal 100 enters the lock screen state while a gallery application displays an image list (or series of images), the controller 180 displays a portion of the image list (which was displayed directly before the entry into the lock screen state) as the preview image 6a on the lock screen 5. Referring to FIG. 9, when the mobile terminal 100 enters the lock screen state while a predetermined application displays a calendar image, the controller 180 displays a reduced (or shrunken) image of the calendar image (which was displayed directly before the entry into the lock screen state) as a preview image 6a on the lock screen 5.

As illustrated in FIG. 8, when the preview image 6a is displayed using a portion of the execution screen of the application according to a proximity touch of at least one point of the touch screen 151, the controller 180 may display different preview images according to the point of the touch screen 151 that is proximity-touched. In more detail, when a specific point of the touch screen 151 is proximity-touched, the controller 180 matches the proximity-touched point to (a correspondingly positioned portion of) the final execution screen of the application that was being executed before the entry into the lock screen state. In addition, the controller 180 displays the corresponding portion of the final execution screen of the application as a preview image based on the matched location of the proximity-touched point.

Figure 10:
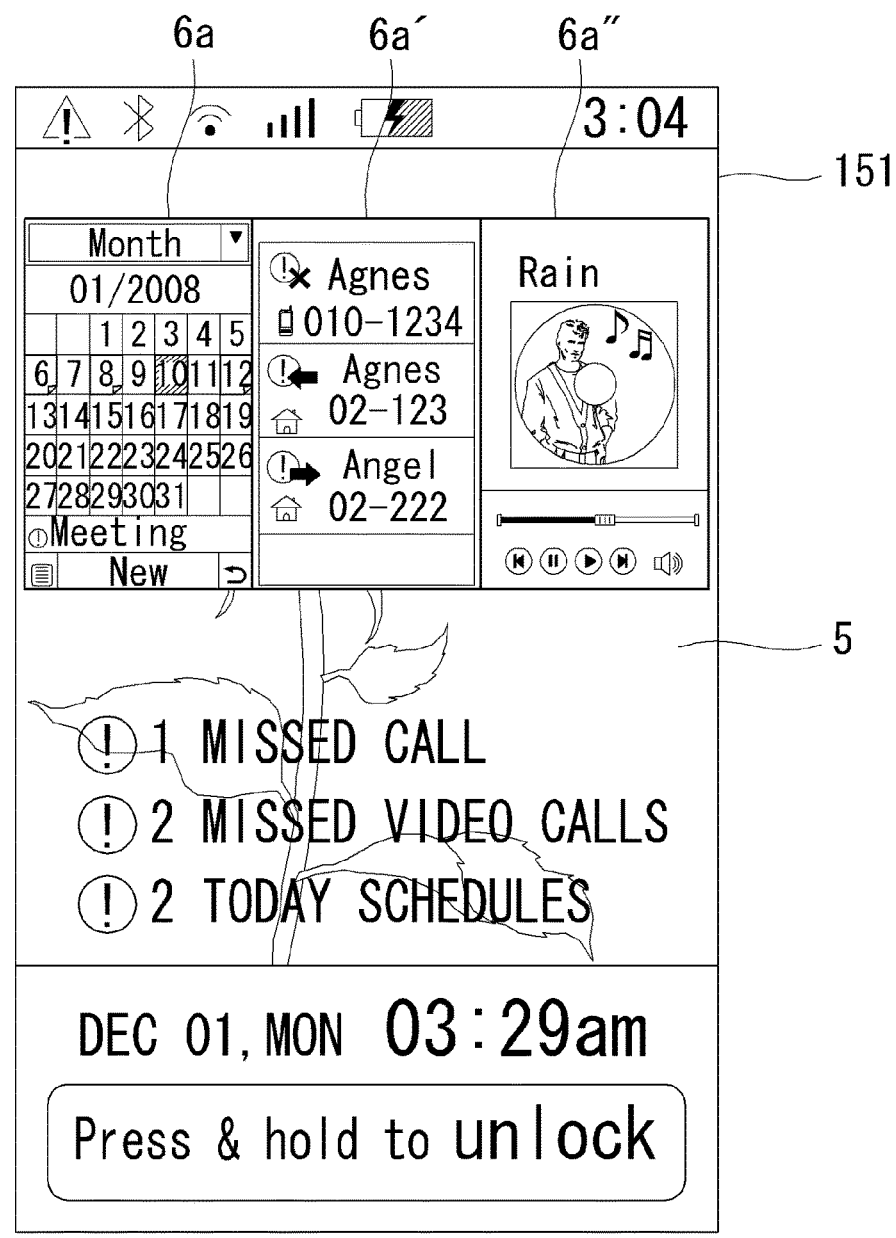
Figure 11:
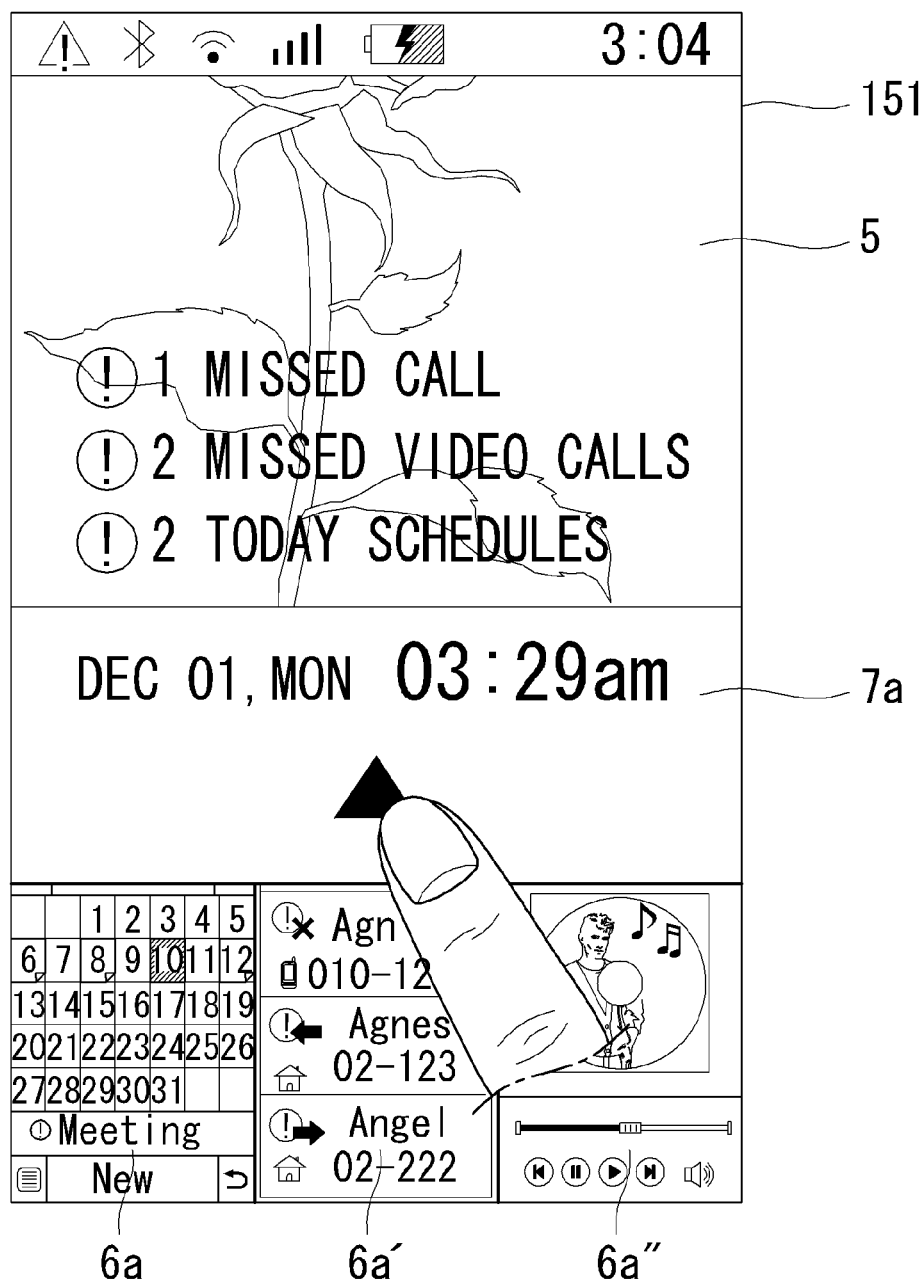

When the mobile terminal 100 is operating in a multi-tasking mode before the entry into the lock screen state, the controller 180 may display all of a plurality of executing screens of applications that were being executed as preview images. Referring to FIG. 10, the controller 180 displays preview images 6a, 6a', and 6a'' by reducing (or shrinking) respective execution screens of a scheduling application, a contacts application, and a music reproducing application that were being executed in the multi-tasking mode before the entry into the lock screen state. In addition, referring to FIG. 11, when the lock release region 7a is selected and dragged upwards, the controller 180 displays at least portions of the execution screens of the scheduling, contacts, and music reproducing applications (which were being executed in the multi-tasking mode before the entry into the lock screen state) as preview images 6a, 6a', and 6a''. The controller 180 may increase portions of the execution screens displayed as the preview images 6a, 6a', and 6a'' as the sizes of the displayed preview images 6a, 6a', and 6a'' are increased as the lock release region 7a is progressively dragged upwards by the proximity touch.

Figure 12:
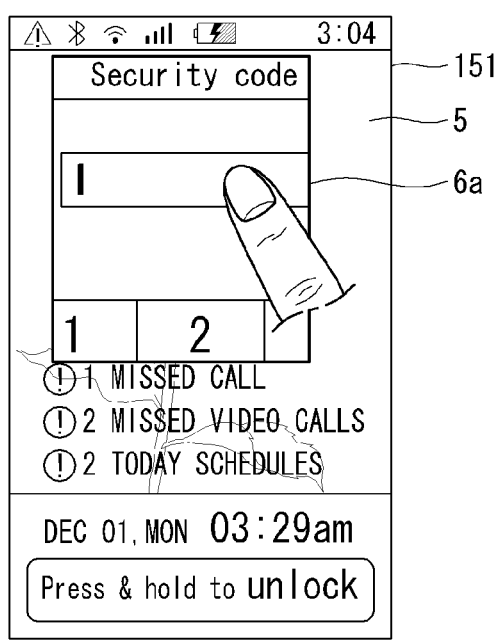

When the mobile terminal 100 has usage restrictions or when access of an application that was being executed before the entry into the lock screen state is restricted, the controller 180 may display at least a portion of a password input screen as a preview image instead of the execution screen of the application. Referring to FIG. 12, the controller 180 displays a portion of a password input screen (instead of the execution screen of the application) as the preview image 6a. The preview image 6a overlaps the lock screen 5.

Referring back to FIG. 5, if ending of (or exit out of) the lock screen state is requested when a preview image of a previously executed application is displayed (S104), the controller 180 ends (or controls the mobile terminal 100 to exit) the lock screen state (S105). In the operation of S104, an input requesting ending of the lock screen state may be received in various manners as described below. FIGS. 13 to 18 are views of screen displays illustrating examples of ending the lock screen state when preview images of an application are displayed on a locked screen.

Figure 13A:
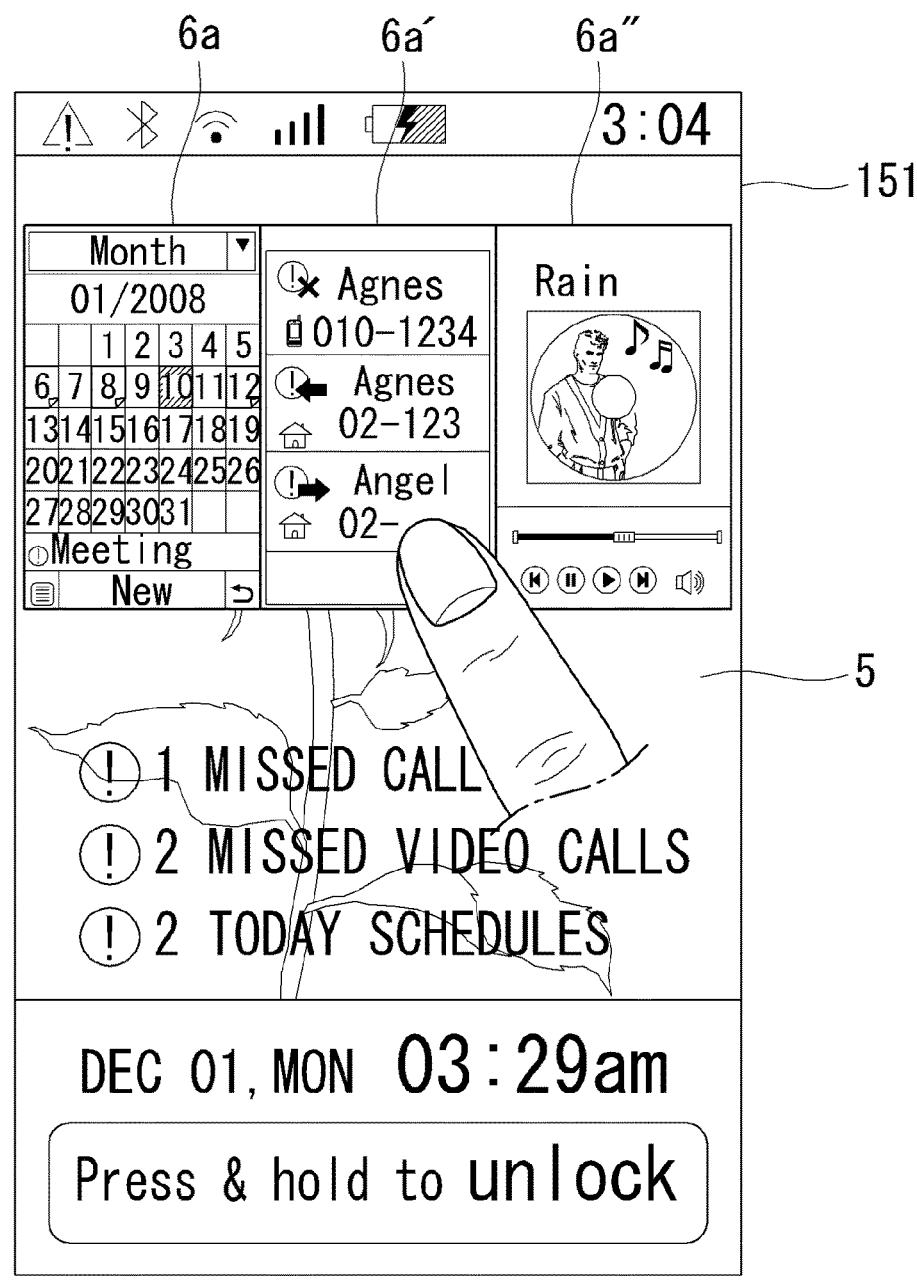
Figure 13B:
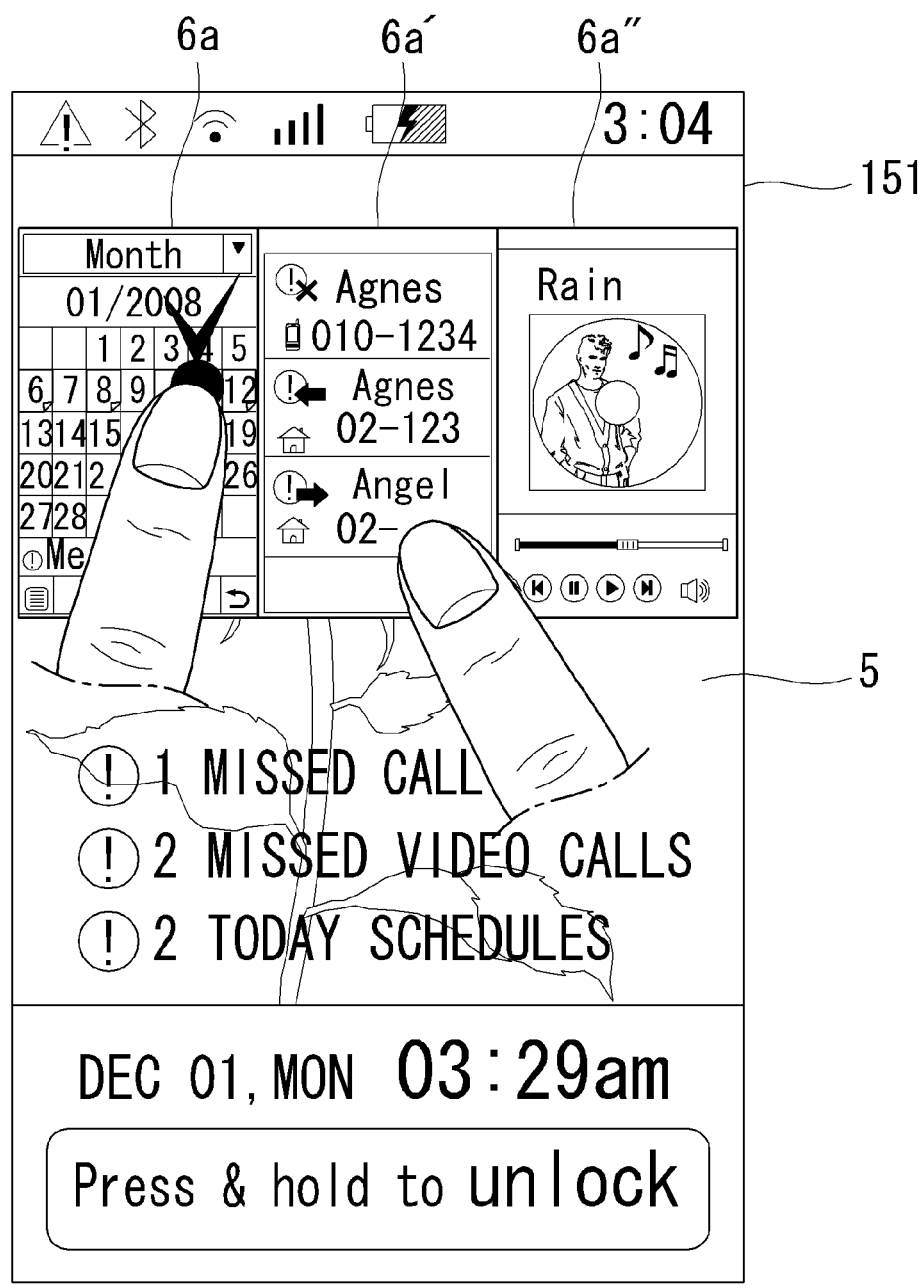
Figure 13C:

The controller 180 may end the lock screen state when the preview image that is displayed in the lock screen state is contacted and touched. Referring to FIG. 13A, the controller 180 displays a plurality of preview images 6*a*, 6*a*', and 6*a*" corresponding to applications that were being executed before the entry into the lock screen state. With continued reference to FIG. 13A, the lock screen 5 is proximity-touched. Consequently, referring to FIG. 13B, the controller 180 ends the lock screen state when any one of the preview images 6*a*, 6*a*', and 6*a*" that are displayed on the screen is contacted and touched. Referring to FIG. 13C, the controller 180 executes the application(s) that was being executed before the entry into the lock screen state and enters an application corresponding to the contacted and touched preview image. That is, the controller 180 displays an execution screen of an application corresponding to the preview image that was contacted and touched on the touch screen 151.

Figure 14A:
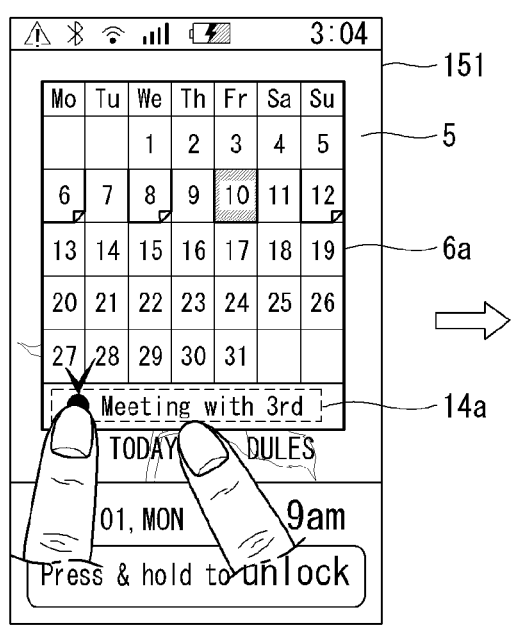
Figure 14B:
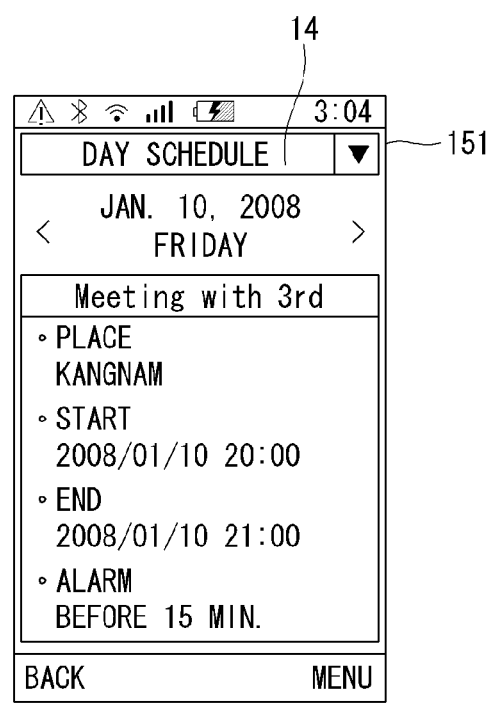

In more detail, the controller 180 stores a final entry step (or operation) of at least one application that is being executed before entering the lock screen state in the memory 160. When the application is executed again at the ending of the lock screen state, the controller 180 executes the application from the state that it was in before the entry into the lock screen state based on the final entry step that is stored in the memory 160. Referring to FIG. 14A, the controller 180 ends the lock screen state when a specific item 14*a* included in the preview image 6*a* is contacted and touched. In addition, the controller 180 re-executes (or again executes) a corresponding application and executes an application function related to the contacted and touched specific item 14*a*. For example, with reference to FIGS. 14A and 14B, when a calendar screen of a predetermined application is displayed in a preview image 6*a* in the lock screen state and when a specific item 14*a* corresponding to the schedule of a particular day is contacted and touched, the controller 180 displays detailed information 14 of the corresponding schedule on the screen.

Figure 15A:
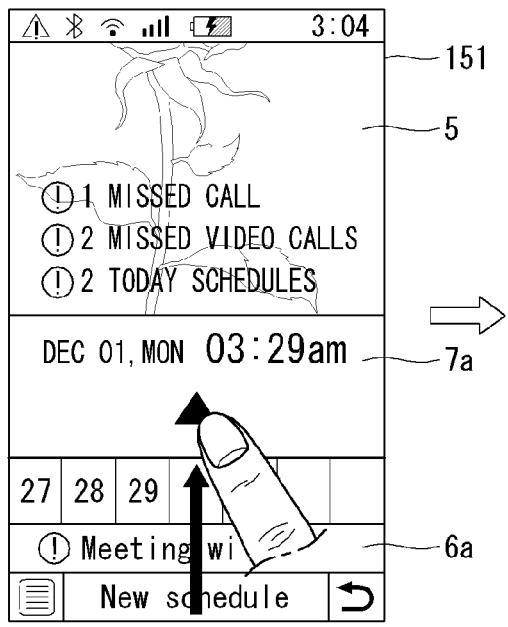
Figure 15B:
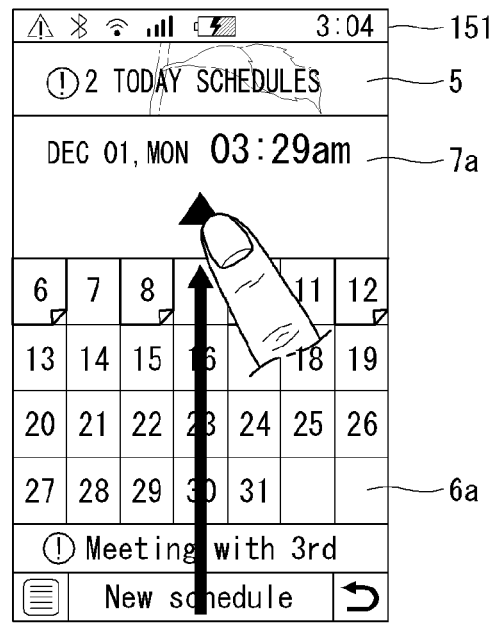
Figure 15C:
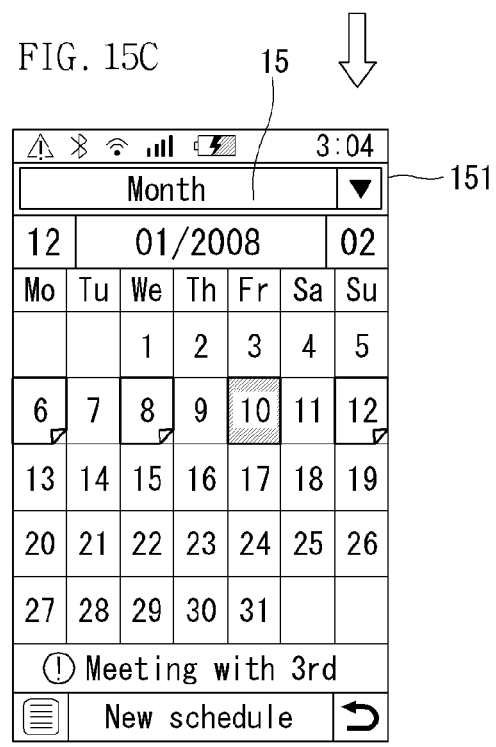

When a specific portion of the lock screen is dragged longer (or farther) than a predetermined distance by the proximity touch, the controller 180 may end the lock screen state. Referring to FIG. 15A, the controller 180 displays the preview image 6*a* of the previously executed application on the screen when a specific region, for example, the lock release region 7*a*, of the lock screen is dragged by proximity touch. Referring to FIG. 15B, the controller 180 ends the lock screen state when the lock release region 7*a* is dragged farther than a predetermined distance. Consequently, referring to FIG. 15C, the controller 180 re-executes an application corresponding to the preview image 6*a*. That is, the controller 180 displays the execution screen 15 of the application corresponding to the preview image 6*a* on the touch screen 151.

Figure 16A:
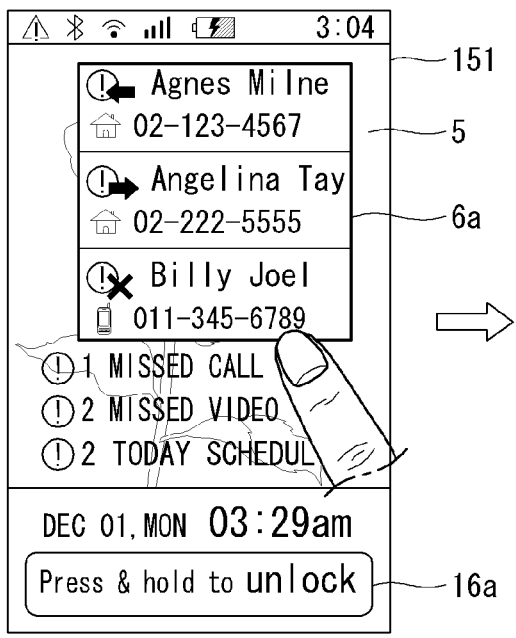
Figure 16B:
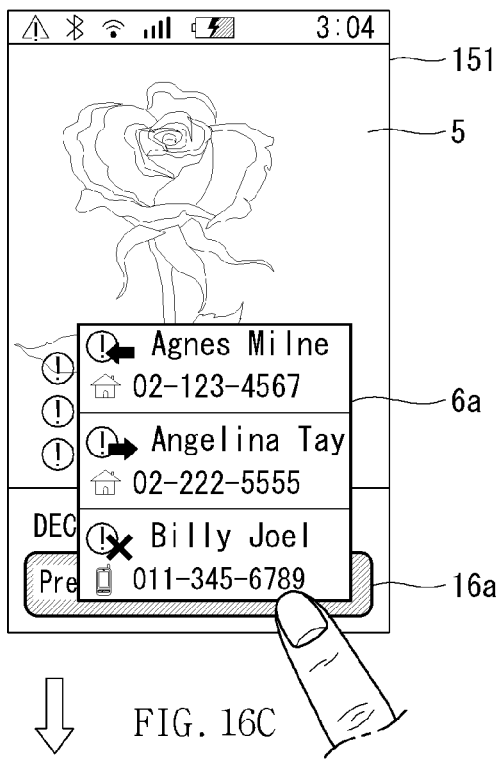
Figure 16C:
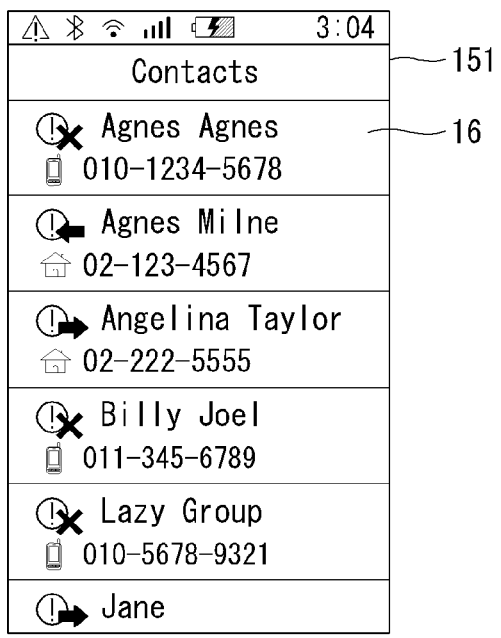

The controller 180 may end the lock screen state when the preview image of the application displayed on the lock screen is dragged into a specific region by the proximity touch. Referring to FIG. 16A, the controller 180 displays the preview image 6*a* of the application that was being executed before the entry into the lock screen state when the lock screen 5 is proximity-touched. The preview image 6*a* is selected by a proximity touch. Referring to FIG. 16B, the controller 180 ends the lock screen state when the preview image 6*a* is dragged into a specific region of the lock screen 5, for example, a lock release button region 16*a*, by the proximity touch. Consequently, referring to FIG. 16C, the controller 180 displays an execution screen of the application corresponding to the dragged preview image 6*a*. That is, the controller 180 displays an execution screen 16 of the application corresponding to the preview image 6*a* on the touch screen 151.

The controller 180 may end the lock screen state when a size of the preview image displayed on the lock screen is increased to become larger than a predetermined size based on a multi-touch input by a proximity touch. Referring to FIG. 17A, the controller 180 displays the preview image 6*a* of the application that was being executed before the entry into the lock screen state when the lock screen 5 is proximity-touched. The preview image 6*a* is selected by a proximity touch. Referring to FIG. 17B, the controller 180 changes the size of the displayed preview image 6*a* when the preview image 6*a* is touched again by the proximity touch and when a drag input that starts from at least one point is received via the proximity touch.

Referring to FIGS. 17C and 17D, the controller 180 ends the lock screen state when the size of the displayed preview image 6*a* is increased to become larger than a predetermined size. In addition, referring to FIG. 17D, the controller 180 re-executes an application that was being executed before the entry into the lock screen state. That is, the controller 180 displays an execution screen 17 of an application corresponding to the preview image 6*a* on the touch screen 151.

In the operation of S105 (see FIG. 5), when the lock screen state is ended as illustrated in FIGS. 13C, 14B, 15C, 16C and 17D, the controller 180 re-executes at least one of the applications that was being executed before the entry into the lock screen state and displays an execution screen of the at least one of the re-executed applications on the touch screen 151. However, in a situation where the mobile terminal 100 has a usage restriction or where access to the application that was being executed before the entry into the lock screen state is restricted, the controller 180 may display a password input screen instead of the execution screen of the application when the lock screen state is ended.

Figure 18A:
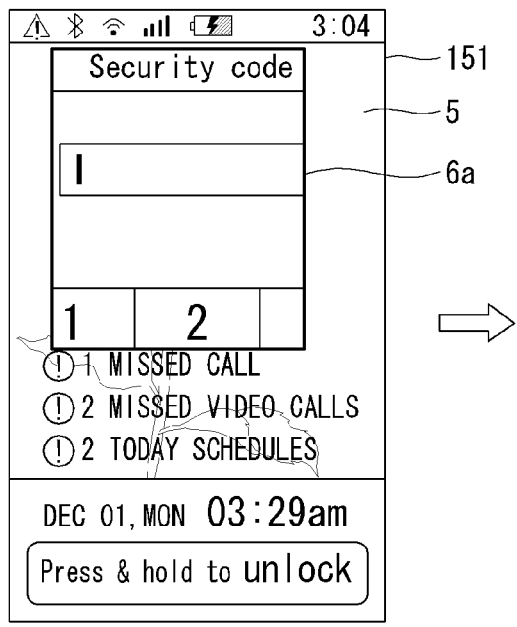
Figure 18B:
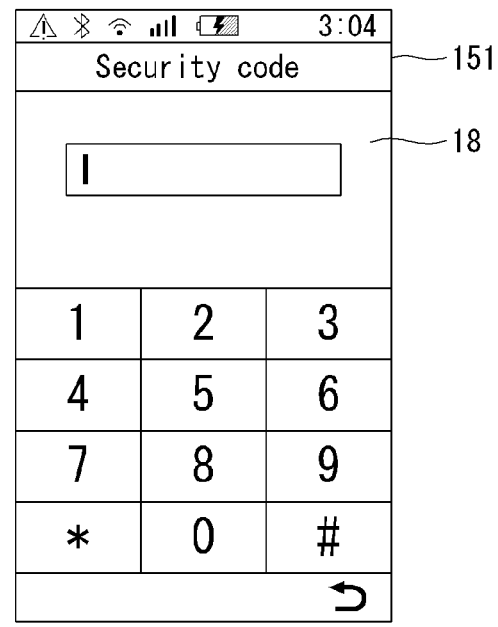

Referring to FIG. 18A, the controller 180 displays a portion of the password input screen as a preview image 6*a* overlapping with the lock screen 5, instead of a portion of the execution screen of the application. Subsequently, referring to FIG. 18B, when the lock screen state is ended, the controller 180 displays the password input screen 18 on the screen.

According to previously-described embodiments of the present invention, it is possible for a user to check a previously executed application in advance using the proximity touch without ending the lock screen state. Moreover, it is also possible for a user to check an application executed before the lock screen state was entered and to proceed toward requesting an ending of the lock screen state without a break. In addition, when the mobile terminal 100 has a usage restricted or when access to the application that was being executed before the entry into the lock screen state is restricted, the controller 180 may display the password input screen as a preview image instead of the execution screen of the application so that user convenience is enhanced and privacy protection is reinforced.

Hereinafter, a method of controlling a mobile terminal 100 according to other embodiments of the present invention and operation of the mobile terminal for performing the method will be described in more detail with reference to FIGS. 19 to 24.

Figure 19:
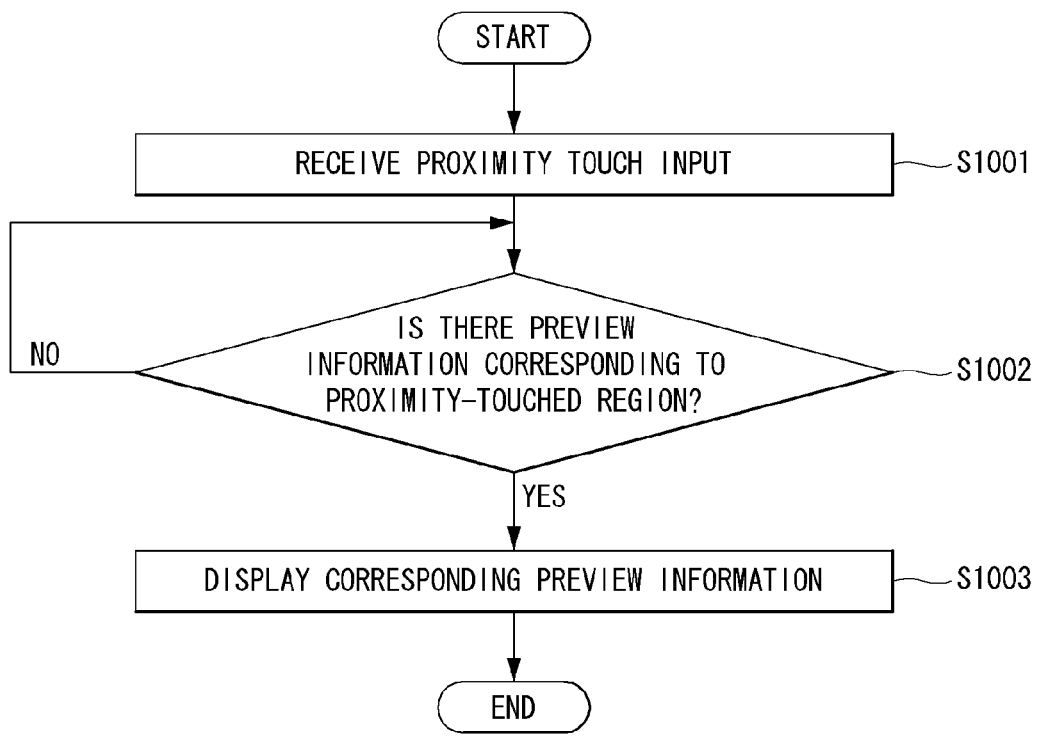
FIG. 19 is a flowchart illustrating a method of controlling a mobile terminal according to another embodiment of the present invention.

FIG. 19 is a flowchart illustrating a method of controlling a mobile terminal according to another embodiment of the present invention. FIGS. 20 to 24 are views of screen displays illustrating the method according to embodiments of the present invention.

Referring to FIG. 19, the controller 180 receives a proximity touch input on the touch screen 151 (S1001). When there is preview information corresponding to a region where the proximity touch occurs (S1002), the controller 180 displays the corresponding preview information on the touch screen 151 (S1003). Regarding the operation of S1003, different preview information may be selected based on an operation mode of the mobile terminal 100, a function of an application that is currently executed, and an item displayed on the region where the proximity touch occurs.

FIGS. 20 to 25 show examples of screen displays displaying preview information in the mobile terminal 100. The controller 180 may display preview information regarding alarm information when the alarm information is proximity-touched while the mobile terminal 100 is operating in the lock screen state. The alarm information includes information of which a user is to be notified such as a missed call, an unchecked received message, and a schedule.

Figure 20A:
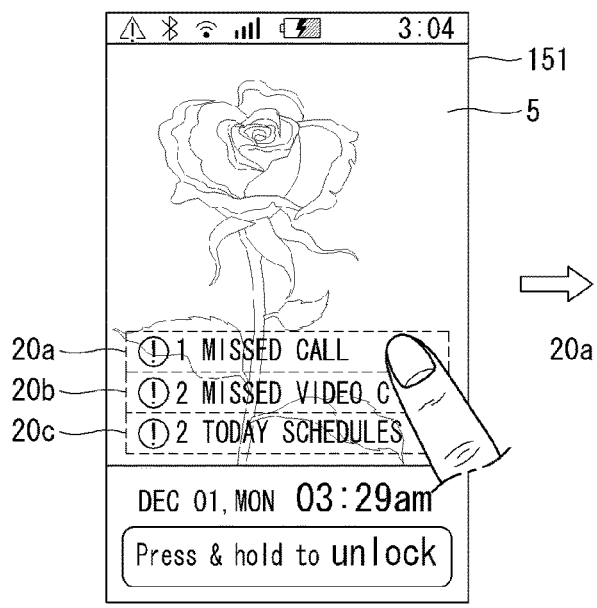
FIGS. 20 to 24 are views of screen displays illustrating examples of displaying preview information in a mobile terminal.
Figure 20B:
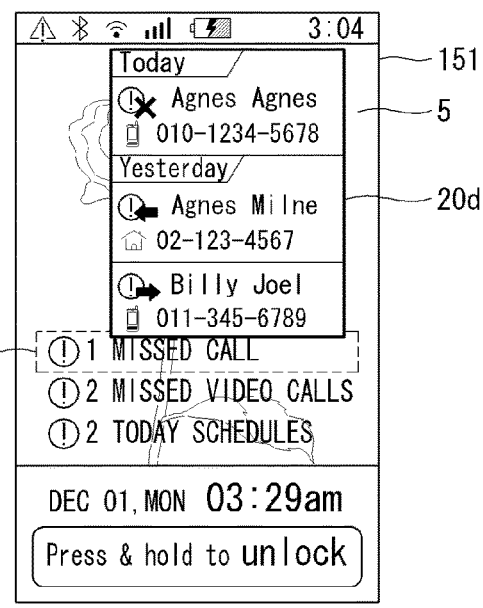

Referring to FIG. 20A, while the mobile terminal 100 is operating in the lock screen state, the controller 180 displays alarm information 20a and 20b for notifying the user of a missed voice call and a missed video call, respectively, and alarm information 20c for notifying the user of a particular schedule (e.g., today's schedule) on the lock screen 5. As illustrated with reference to FIG. 20A, among the alarm information 20a, 20b and 20c that is displayed on the lock screen 5, the alarm information 20a for notifying the user of a missed voice call number is proximity-touched (S1101). Subsequently, referring to FIG. 20B, the controller 180 displays preview information 20d corresponding to the missed calls on the lock screen 5. When the displayed preview information 20d is contacted and touched, the controller 180 may end the lock screen state and display more detailed information corresponding to the contacted-and-touched preview information 20d on the screen.

When a specific region of a message writing screen is proximity-touched during the writing (or creation) of a message, the controller 180 may display preview information (e.g., a preview) of the in-progress message on the screen.

Figure 21A:
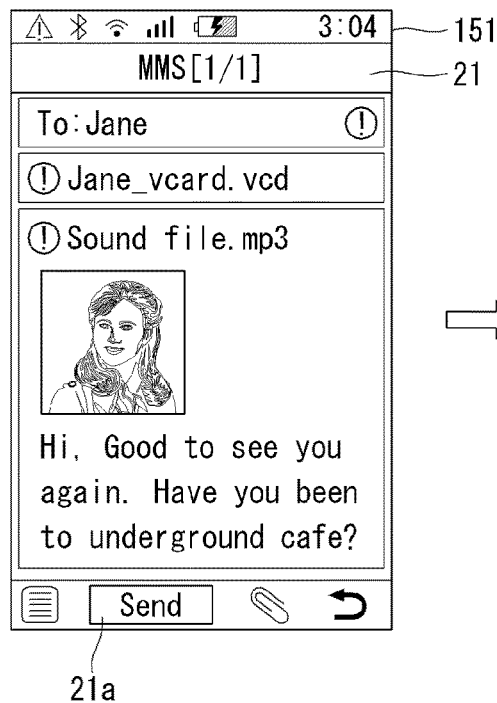
Figure 21B:
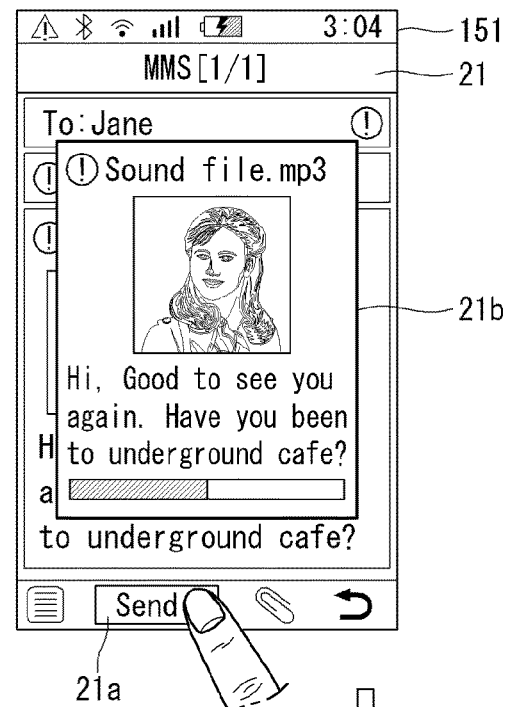
Figure 21D:
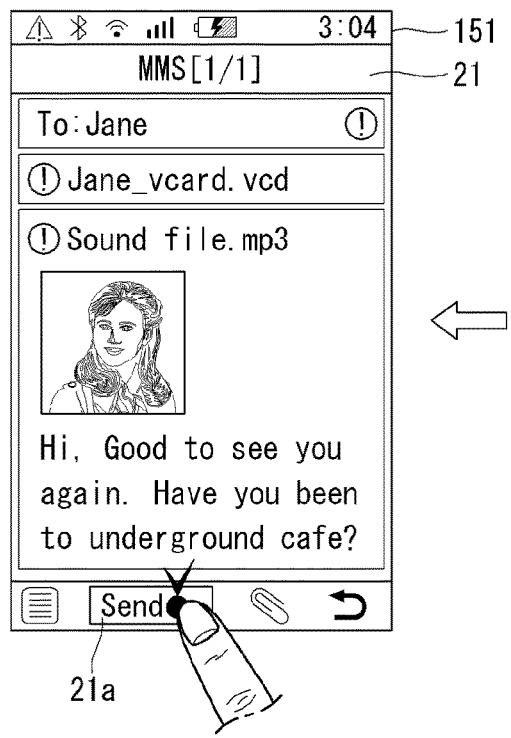

Referring to FIG. 21A, the controller 180 displays a message writing screen 21 on the touch screen 151. Referring to FIG. 21B, when a specific region of the message writing screen 21, for example, a region where a send button 21a is displayed, is proximity-touched, the controller 180 displays preview information 21b of the message that is being written. That is, the controller 180 displays a preview image of the current message on the screen. The controller 180 may activate or terminate display of the preview information according to a proximity touch depth of the send button 21a.

Figure 21C:
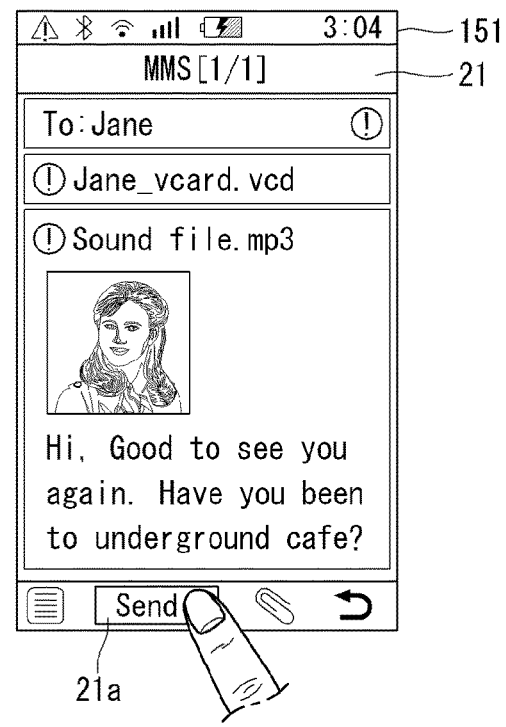

For example, referring to FIG. 21C, when a distance between a pointer causing the proximity touch (e.g., the user's finger) and the touch screen 151 becomes shorter than a predetermined distance, the controller 180 deletes the preview information 21b displayed on the screen. Further, referring to FIG. 21D, when the send button 21a is contacted and touched, the controller 180 executes a send function, which is an inherent function mapped (or corresponding) to the send button 21a. That is, the controller 180 transmits the current written message to a designated recipient.

For example, with reference back to FIG. 4, the controller 180 activates the displaying of the preview information 21b when a distance between the pointer and the touch screen 151 is within a range from D1 to D3 (e.g., a range from greater than or equal to D1 to less than or equal to D3). When the distance between the pointer and the touch screen 151 becomes shorter than D1, the controller 180 inactivates (or terminates) the displaying of the preview information 21b. In addition, when the distance between the pointer and the touch screen 151 is reduced to D0, that is, when the send button 21a displayed on the touch screen 151 is directly contacted and touched, the controller 180 executes an inherent function mapped to the send button 21a.

The controller 180 may display preview information (e.g., a preview) of a photographed image when a specific region of a photographing screen is proximity-touched while the mobile terminal 100 is operating in a photographing mode. That is, the controller 180 displays a photographed image of an external view that is input through the camera 121 as a preview image.

Figure 22A:
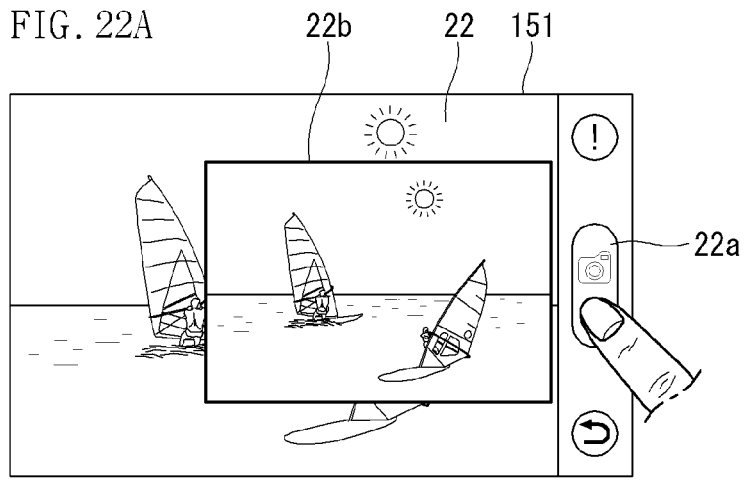
Figure 22B:
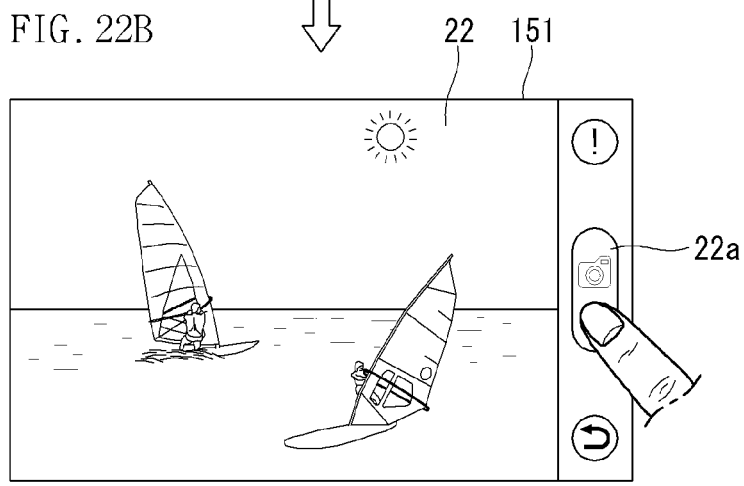
Figure 22C:
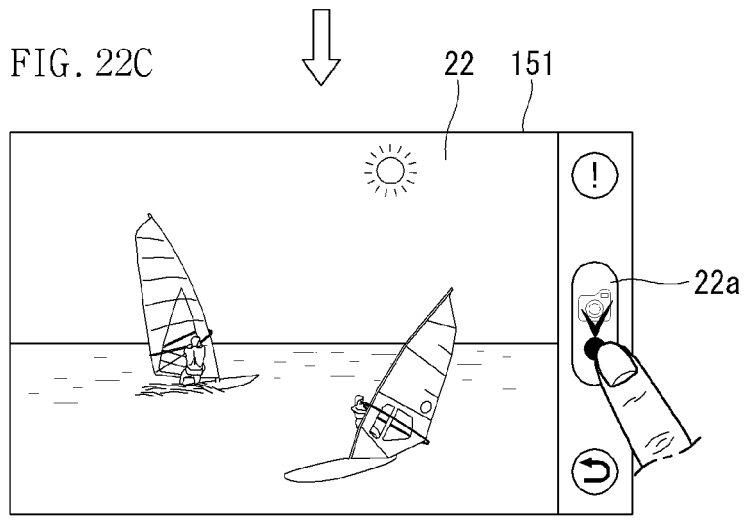

Referring to FIG. 22A, the controller 180 displays a photographed image 22 on the screen when the mobile terminal 100 enters the photographing mode. When a specific region of the photographing screen 22, for example, a photograph button 22a is proximity-touched, the controller 180 displays an image generated by photographing an external view that is input through the camera 121 as preview information 22b. That is, the controller 180 displays a preview image, generated by photographing an external view that is currently input through the camera 121, on the screen.

The controller 180 may activate or inactivate the displaying of the preview information 22b according to the proximity touch depth with respect to the photograph button 22a. For example, referring to FIG. 22B, the controller 180 inactivates the displaying of the preview information 22b when the proximity touch depth of the photograph button 22a becomes shorter than a predetermined distance. In addition, referring to FIG. 22C, the controller 180 executes a photographing function (an inherent function mapped (or corresponding) to the photograph button 22a) when the photograph button 22a is contacted and touched. That is, the controller 180 photographs an external view input through the camera 121 and stores the photographed image in the memory 160.

For example, with reference back to FIG. 4, when a distance between a pointer causing the proximity touch (e.g., the user's finger) and the touch screen 151 is within a range from D1 to D3, the controller 180 activates the displaying of the preview information 22b. When the distance between the pointer and the touch screen 151 becomes shorter than D1, the controller 180 inactivates the displaying of the preview information 22b. In addition, when the distance between the pointer and the touch screen 151 is reduced to D0, that is, when the photograph button 22a displayed on the touch screen 151 is directly contacted and touched, the controller 180 executes an inherent function mapped to the photograph button 22a.

The controller 180 may display preview information of a previous channel or a next channel relative to a channel that is currently being received when a specific region is proximity-touched while the mobile terminal 100 is operating in a broadcast receiving mode. The preview information of the previous channel or the next channel may be schedule information acquired from a preview image of broadcasting content that is currently being broadcasted through a corresponding channel or an electronic program guide (EPG). In the former situation, the controller 180 receives broadcasting content of a previous channel or a next channel in the background during the reception of broadcasting content through a current channel. When a user requests a display of preview information, the controller 180 displays a preview image of the received broadcasting content. In the latter situation, the controller 180 receives EPG information of a previous channel or a next channel in the background during the reception of broadcasting content through a current channel. When a user requests a display of preview information, the controller 180 displays a broadcasting schedule using the received EPG information on the screen.

Figure 23A:
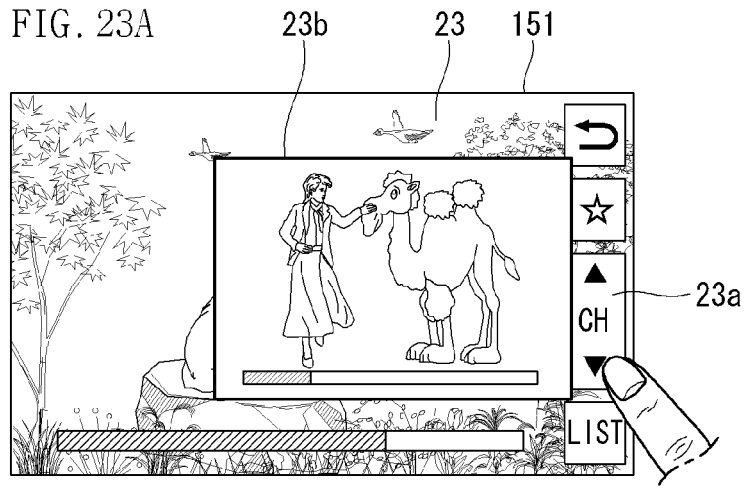
Figure 23B:
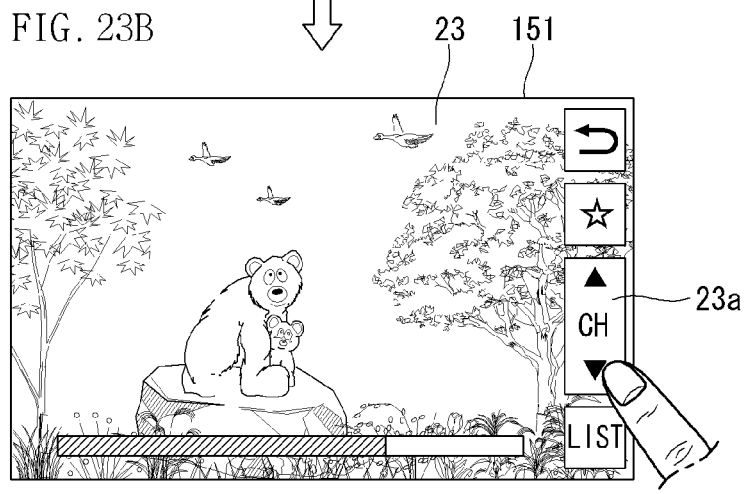

Referring to FIG. 23A, the controller 180 displays a broadcast receiving screen 23 on the screen when the mobile terminal 100 enters a broadcast receiving mode. When a specific region of the broadcast receiving screen 23, for example, a region where a channel changing button 23a is displayed is proximity-touched, the controller 180 displays preview information 23b of a channel previous to or next to the current channel. For example, when a channel changing button 23a for requesting a change to a previous channel (e.g., the lower pointer of changing button 23a) is proximity-touched, the controller 180 may display preview information of the previous channel on the screen. In addition, when the channel changing button 23a for requesting a change to a next channel (e.g., the upper pointer of changing button 23a) is proximity-touched, the controller 180 may display preview information of the next channel on the screen.

Figure 23C:
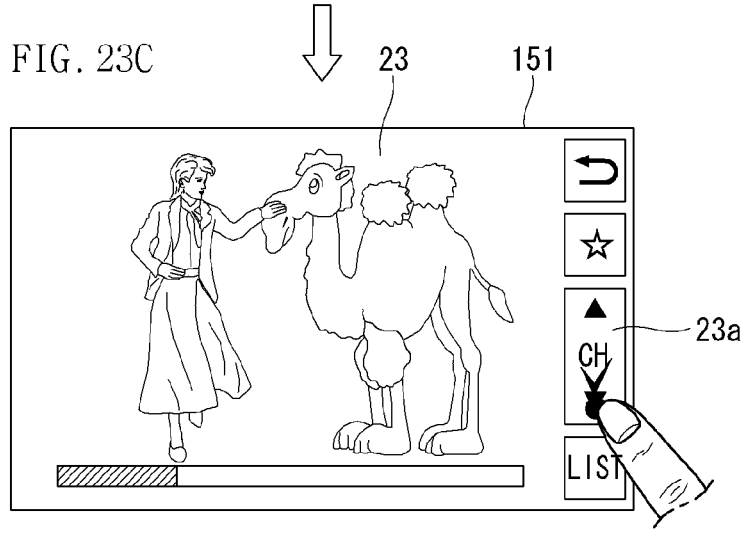

The controller 180 may activate or inactivate the displaying of preview information according to the proximity touch depth with respect to the channel changing button 23a. For example, referring to FIG. 23B, when a proximity depth at which the channel changing button 23a is proximity-touched is less than a predetermined distance, the controller 180 inactivates the displaying of the preview information 23b that was displayed earlier. Referring to FIG. 23C, when the channel changing button 23a is contacted and touched, the controller 180 executes a channel changing function, which is an inherent function mapped (or corresponding) to the channel changing button 23a. That is, the controller 180 displays broadcasting content received for the previous channel or the next channel on the broadcast receiving screen 23.

For example, referring back to FIG. 4, the controller 180 activates the displaying of the preview information 23b when a distance between a pointer causing the proximity touch (e.g., the user's finger) and the touch screen 151 is within a range from D1 to D3. When a distance between the pointer and the touch screen 151 becomes shorter than D1, the controller 180 inactivates the displaying of the preview information 23b. In addition, when a distance between the pointer and the touch screen 151 is reduced to D0, that is, when the channel changing button 23a displayed on the touch screen 151 is directly contacted and touched, the controller 180 executes an inherent function mapped to the channel changing button 23a.

The controller 180 may display preview information of a web page linked to a specific region when the specific region is touched during the displaying of a web page through a web browser.

Figure 24A:
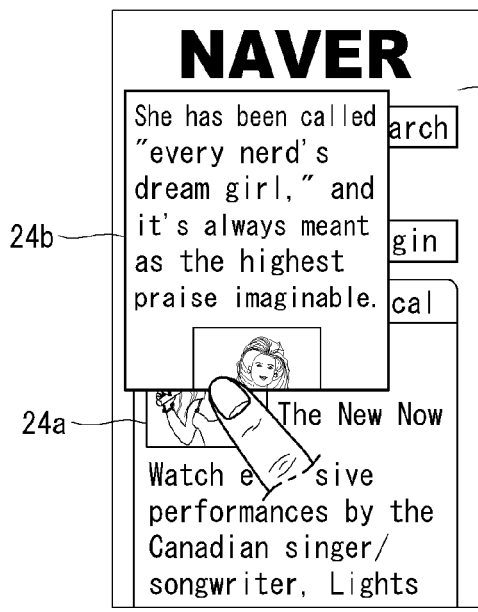
Figure 24B:
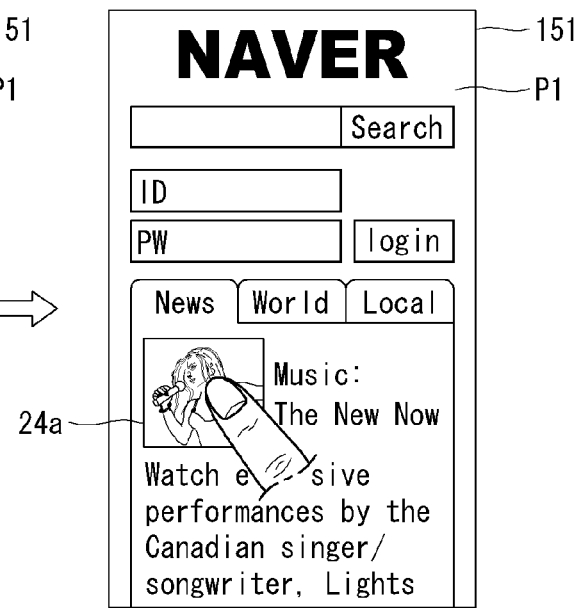

Referring to FIG. 24A, the controller 180 displays a web page P1 through a web browser on the screen. An item linking to another web page P2 is located in a region 24a of the web page P1. When the region 24a is proximity-touched, the controller 180 displays preview information 24b of the web page P2 (see, e.g., FIG. 24D) linked to the corresponding region. For example, the controller 180 displays a portion (e.g., an image) of the web page P2 linked to the region that is proximity-touched as preview information 24b.

Figure 24D:
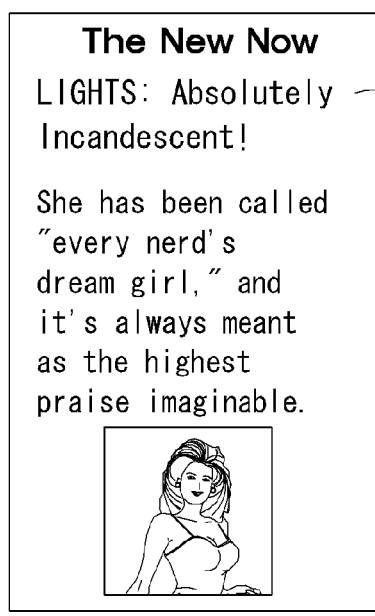
Figure 24C:
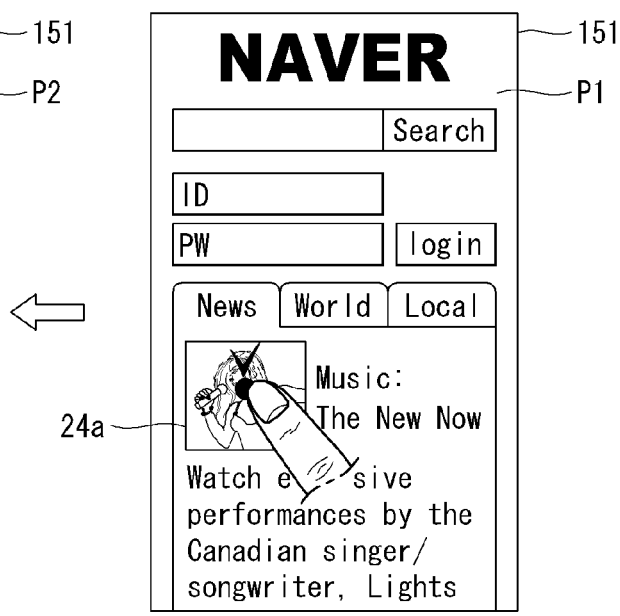

The controller 180 may activate or inactivate the displaying of the preview information 24b according to the proximity-touch depth with respect to the item 24a to which the web page P2 is linked. For example, referring to FIG. 24B, when the proximity depth where the item 24a is proximity-touched is shorter than a predetermined distance, the controller 180 inactivates the displaying of the preview information 24b that was displayed earlier. Referring to FIG. 24C, when the item 24a is contacted and touched, the controller 180 accesses the web page P2 linked to the corresponding item 24a. Referring to FIG. 24D, the controller 180 displays the corresponding web page P2 on the screen.

For example, referring back to FIG. 4, when a distance between a pointer causing the proximity touch (e.g., the user's finger) and the touch screen 151 is within a range from D1 to D3, the controller 180 activates the displaying of the preview information 24b. When a distance between the pointer and the touch screen 151 becomes shorter than D1, the controller 180 inactivates the displaying of the preview information 24b. In addition, when a distance between the pointer and the touch screen 151 is reduced to D0, that is, when the item 24a displayed on the touch screen 151 is directly contacted and touched, the controller 180 displays the web page P2 linked to the corresponding item 24a on the entire screen.

According to another embodiment of the present invention, it is possible for a user to check (in advance) a missed call, a missed message, and today's schedule by proximity-touching the corresponding alarm information without ending the lock screen state. In addition, a user may check (in advance) a written message in a message writing screen before transmission of the written message and may then send the written message. Also, a user may check (in advance) a photographed image in a photographing screen without switching screens. Also, a user may check (in advance) broadcasting content of another channel and may then select a desired channel. Moreover, a user may check content of a linked web page without (fully) accessing the linked web page.

Hereinafter, a method of controlling a mobile terminal 100 according to another embodiment of the present invention and operation of the mobile terminal 100 performing the control method will be described in more detail with reference to FIGS. 25 to 31.

Figure 25:
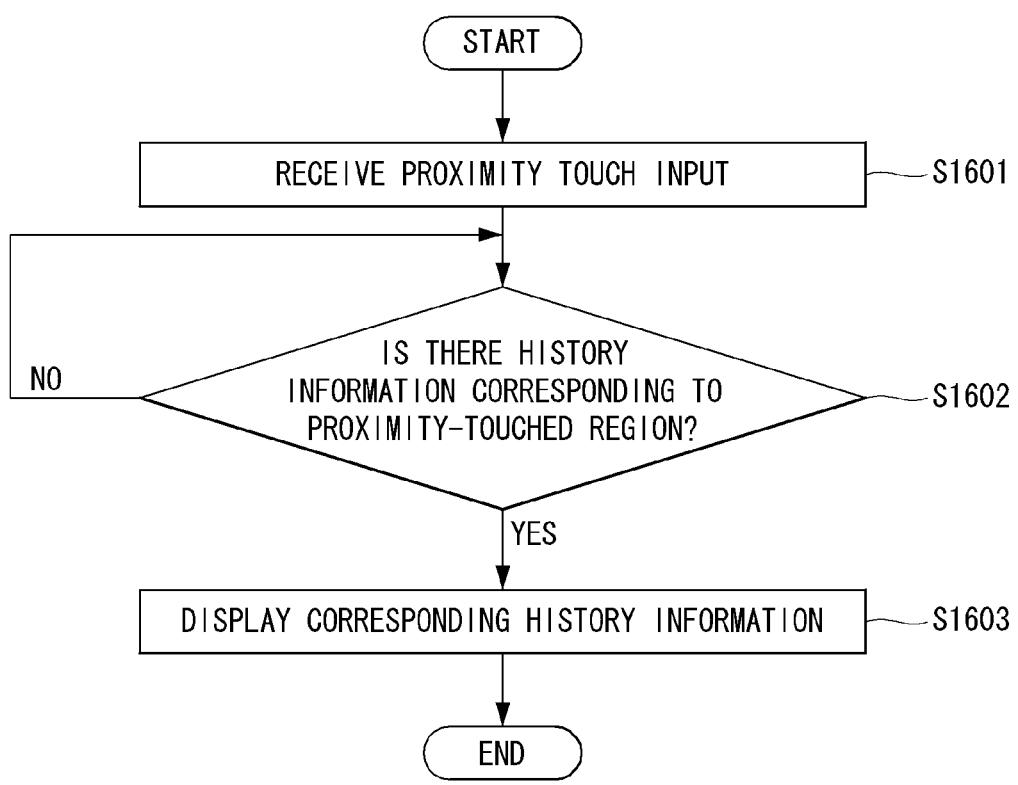
FIG. 25 is a flow chart illustrating a method of controlling a mobile terminal according to still another embodiment of the present invention.

FIG. 25 is a flowchart illustrating a control method of the mobile terminal 100 according to still another embodiment of the present invention. FIGS. 26 to 31 are views illustrating a control method of the mobile terminal 100 according to still another embodiment of the present invention.

Referring to FIG. 25, the controller 180 receives a proximity touch input (e.g., via detection of a particular pressure) through the touch screen 151 (S1601). The controller 180 determines whether there is history information corresponding to a proximity-touched region (S1602). If such information exists, the controller 180 displays the corresponding history information on the touch screen 151 (S1603).

In the operation of S1603, different parts of the history information may be selected based on the operation mode of the mobile terminal 100, a function of an application that is being executed currently, and an item displayed in the proximity-touched region.

FIGS. 26 to 31 are views of screen displays illustrating examples of displaying the history information in the mobile terminal 100 according to various embodiments.

Figure 26A:
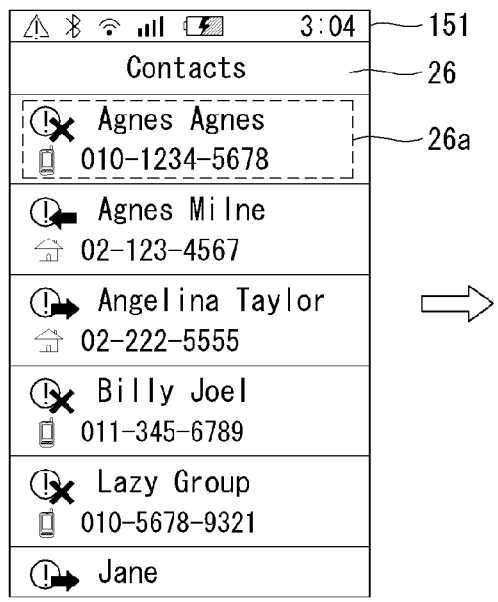
FIGS. 26 to 31 are views illustrating of screen displays illustrating examples of history information.
Figure 26B:
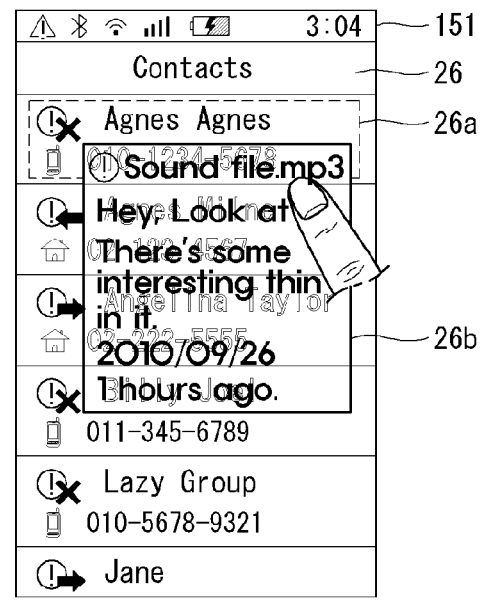

When contact information displayed on the screen is proximity-touched, the controller 180 may display history information of a task that was performed previously (e.g., recently) using the proximity-touched contact information. Referring to FIG. 26A, the controller 180 displays a contact screen 26 on the touch screen 151. Referring to FIG. 26B, when specific contact information 26a is proximity-touched on the contact screen 26, the controller 180 displays history information 26b related to a task performed recently using the contact information 26a that is proximity-touched.

For example, when a call to/from the contact of contact information 26a has occurred recently, the controller 180 may display call history or detail information of the corresponding call as the history information 26b using the proximity-touched contact information 26a on the screen. In addition, when a message to/from the contact has been transmitted recently, the controller 180 may display history of the message transmission or detail information of a corresponding message (see, e.g., FIG. 26B) as the history information 26b using the proximity-touched contact information 26a on the screen. The history information may be displayed such that it overlaps with the contact screen 26 in the form of a pop-up window, or it may be displayed in a semi-transparent manner. Also, the history information may be displayed in response to only receipt (e.g., detection) of the proximity-touch input in a particular region.

Figure 27A:
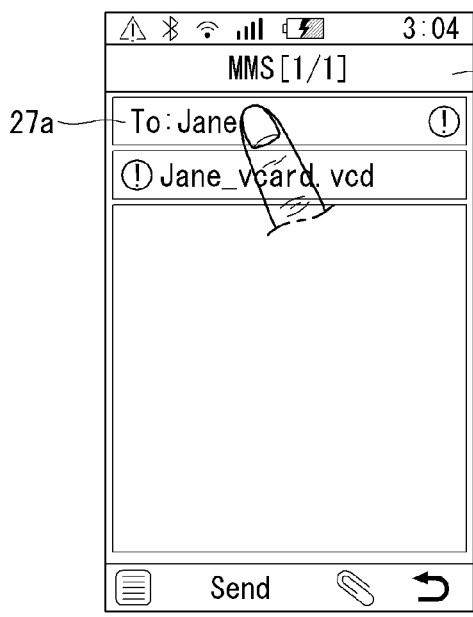
Figure 27B:
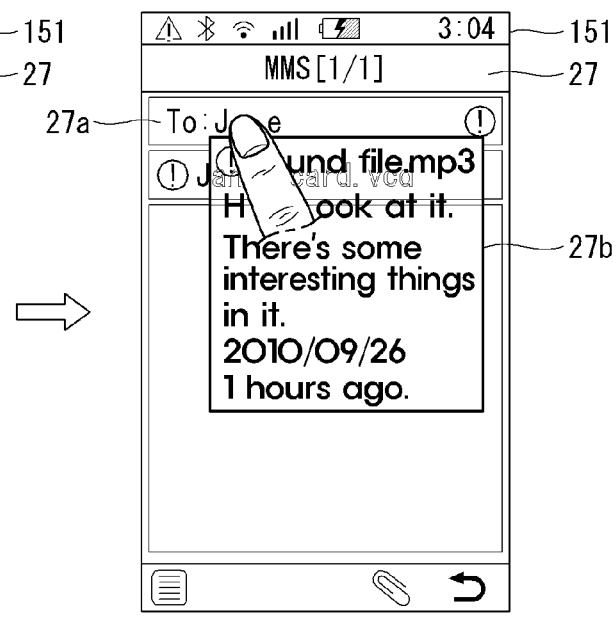

When receiver information (information regarding an intended recipient) is proximity-touched on a message writing screen, the controller 180 may display history information of a message that was received recently in association with the proximity-touched receiver information on the screen. Referring to FIG. 27A, the controller 180 displays a message writing screen 27 on the touch screen 151. Receiver information 27a is also displayed. Referring to FIG. 27B, when the receiver information 27a is proximity-touched on the message writing screen 27, the controller 180 displays a message that was received recently in association with the receiver information 27a as the history information 27b on the screen. The history information may be displayed such that it overlaps with the message writing screen 27 in the form of a pop-up window, or it may be displayed in a semi-transparent manner. In addition, the history information may be displayed in response to only receipt (e.g., detection) of the proximity-touch input in a particular region.

When a specific region is proximity-touched on a web browser screen, the controller 180 may display history information regarding web pages to be accessed using a web browser.

Figure 28A:
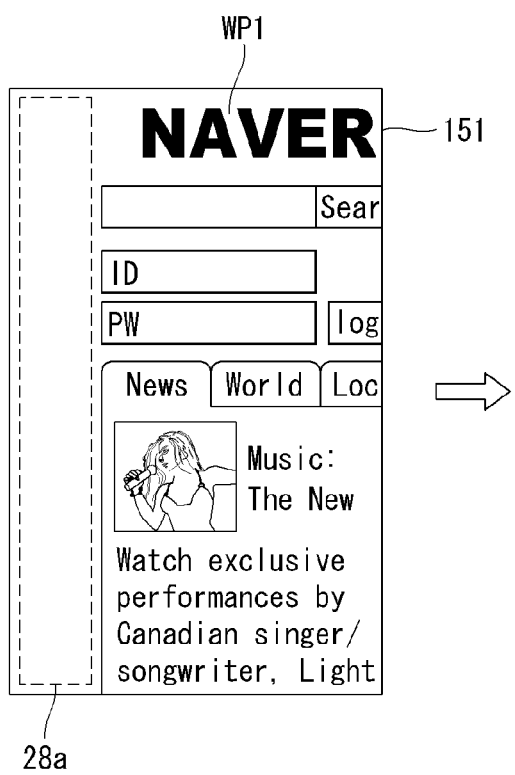
Figure 28B:

Referring to FIG. 28A, the controller 180 displays web page WP1 on a web browser screen. The web page WP1 includes an empty (or blank) region 28a. Referring to FIG. 28B, when a specific region of the web browser screen, for example, the empty region 28a of the web page WP1 that is being displayed, is proximity-touched, the controller 180 displays a portion of another web page WP2 accessed through the web browser as history information 28b. For example, the controller 180 may display the other web page WP2 on the web page WP1 in a layered manner.

Figure 29A:
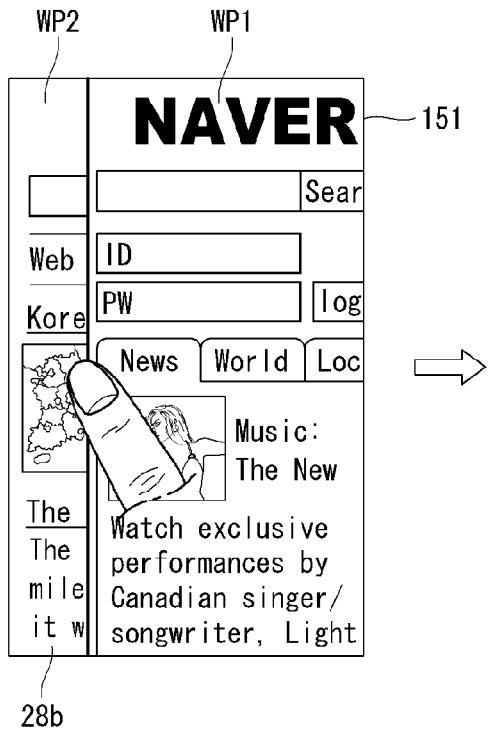
Figure 29B:
Figure 29C:

FIGS. 29 and 30 are views illustrating examples of switching web pages using the history information described above with reference to FIGS. 28A and 28B. Referring to FIG. 29A, when an empty region 28a (see, e.g., FIG. 28A) of a web page WP1 that is currently displayed is proximity-touched, the controller 180 displays history information 28b using a portion of another web page WP2 that is accessed through the web browser. Referring to FIG. 29B, when the web page WP2 that is displayed as the history information 28b is dragged by the proximity-touch, the controller 180 changes a size of the displayed web page WP2 based on a drag path. Referring to FIG. 29C, when the web page WP2 is dragged into a specific region farther than a predetermined distance, the controller 180 ends the displaying of the history information and displays the web page WP2 on the entire screen.

Figure 30A:
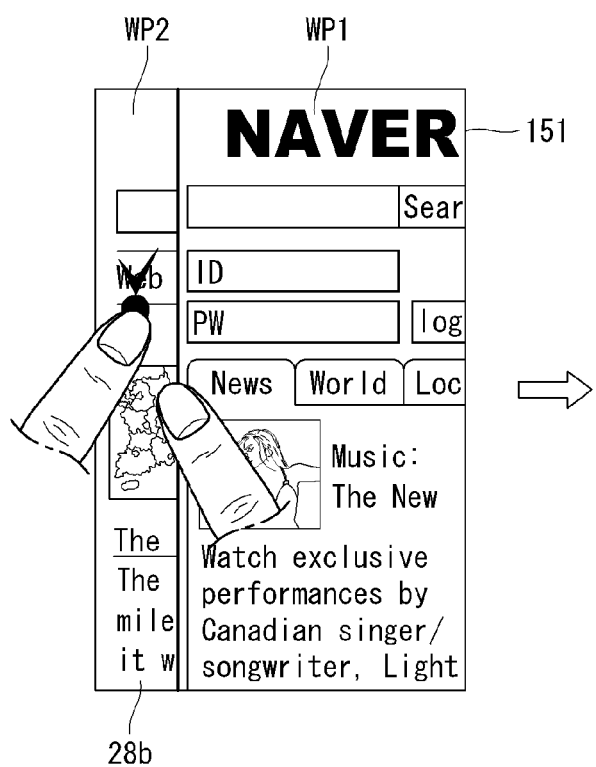
Figure 30B:
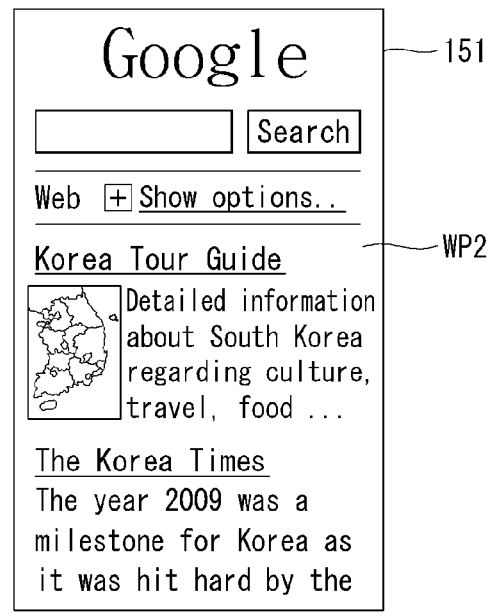

Referring to FIG. 30A, a web page WP2 that is displayed as the history information 28b is directly contact and touched. In response, referring to FIG. 30B, the controller 180 ends the displaying of the history information 28b and displays the web page WP2 on the whole screen.

Although the figures of FIGS. 28 to 30 illustrate the displaying of history information by displaying web pages in a layered manner, the controller 180 may display the history information using reduced (e.g., shrunken) images of the respective web pages.

Figure 31A:
Figure 31B:
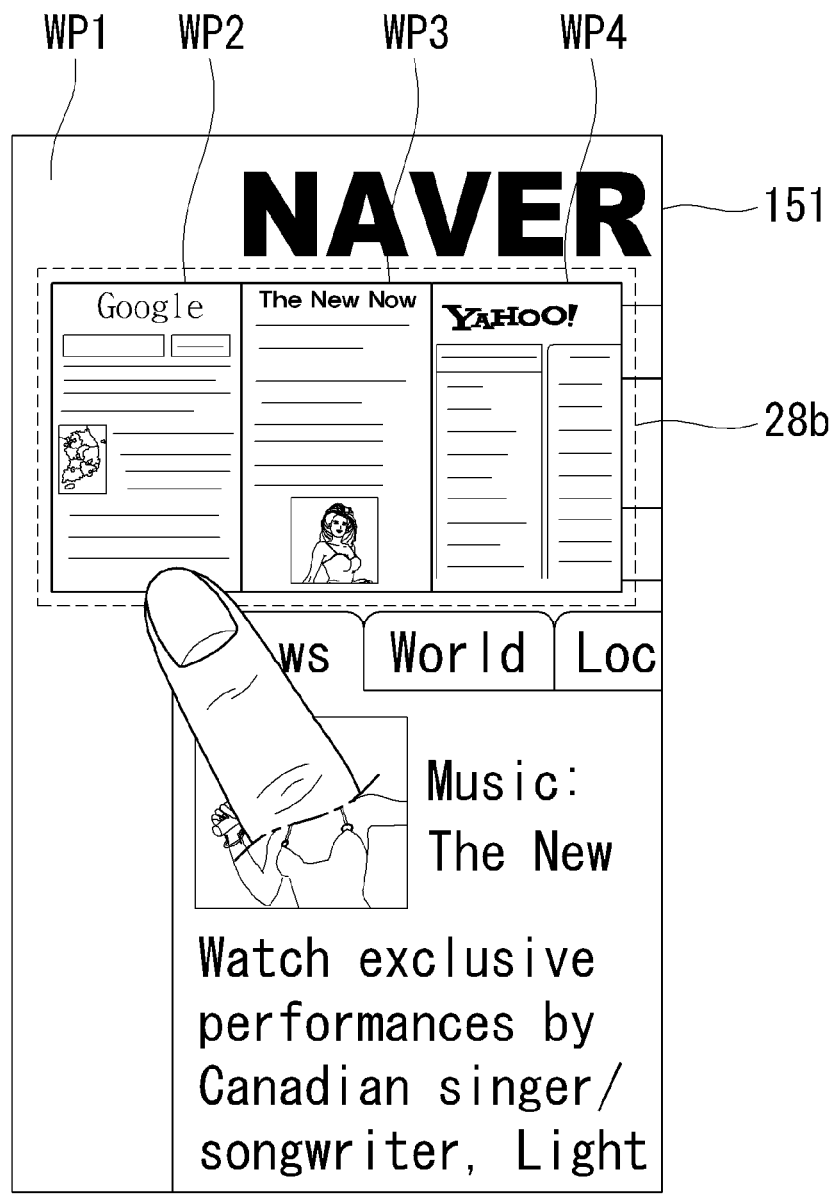
Figure 31C:
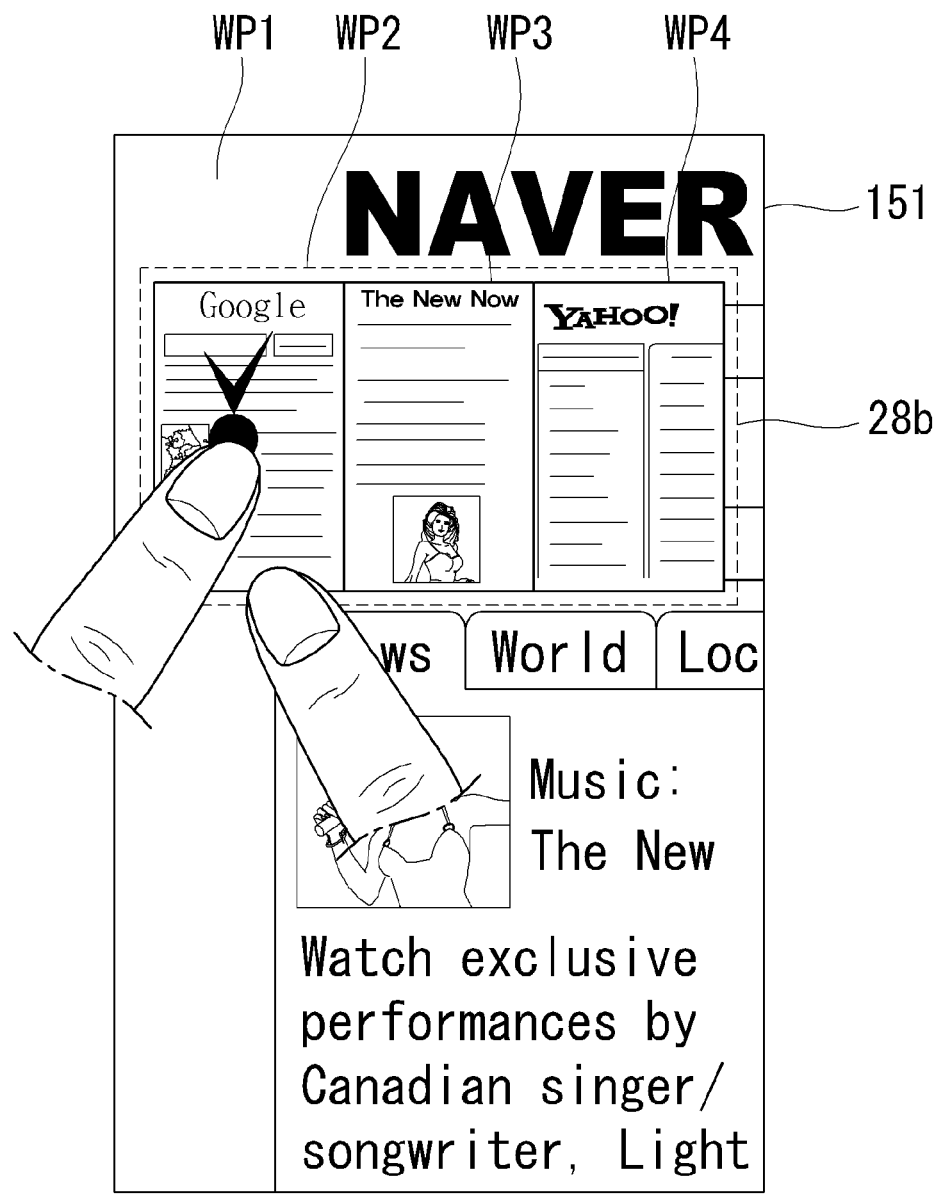
Figure 31D:

Referring to FIG. 31A, the controller 180 displays web page WP1 on a web browser screen. The web page WP1 includes an empty (or blank) region 28a. Referring to FIG. 31B, when a specific region of the web browser screen, for example, the empty region 28a of the web page WP1 that is currently displayed, is proximity-touched, the controller 180 displays the history information 28b using reduced images of other web pages WP2, WP3, WP4 that are accessed through the web browser. With reference to FIG. 31C, one of the other web pages (e.g., WP2) that are displayed on the screen is directly contacted and touched. In response, referring to FIG. 31D, the controller 180 ends the displaying of the history information 28b and displays the web page WP2 on the entire screen.

According to still another embodiment of the present invention, it is possible for a user to check history information related to contact information without selecting a menu related to the contact information. Since only the history information is displayed using the proximity touch, the likelihood of initiating a highly undesirable action may be reduced. Since only the history information is displayed in response to the proximity touch, inconvenience caused by displaying the history information before actually performing another function on the contact screen is minimal.

A user may check a message that was recently sent by a recipient in the message writing screen. Therefore, while composing a message with reference to the recently received message, a user may check the recently received message in the message writing screen without closing the message writing screen in order to check the previously received message. As a result, user convenience is enhanced.

In addition, when a specific region is proximity-touched in a web browser screen, the controller 180 may display history information on a web page that was previously accessed on the screen. A user may check web pages that are currently being accessed only by proximity-touching a specific region of a web browser screen. Moreover, since only the history information is displayed using the proximity touch, the likelihood of unintentionally opening an undesired web page or triggering the execution of undesired content may be reduced.

The disclosed methods of controlling the mobile terminal may be written as computer programs and may be implemented in digital microprocessors that execute the programs using a computer readable recording medium. The methods of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
   a touch screen for displaying and receiving information; and
   a controller for:
      generating and storing a preview image of a specific application executed before entering a lock screen state whenever an input for entering the lock screen state is received;
      controlling the touch screen to display a lock screen upon the mobile terminal entering the lock screen state;
      controlling the touch screen to display, on the displayed lock screen, the stored preview image when a proximity touch input on the displayed lock screen is received, wherein the preview image of the specific application includes at least a portion of an execution screen of the specific application; and
      controlling the mobile terminal to exit the lock screen state and to execute the specific application when a contact touch input on the preview image is received,
   wherein the controller generates the preview image including a plurality of executing screens of multi-tasking applications when the mobile terminal is operating in a multi-tasking mode before entering into the lock screen state,
   wherein the proximity touch input is generated when an object approaches the touch screen without mechanical contact, and
   wherein the contact touch input is generated when the object touches the touch screen.

2. The mobile terminal of claim 1, wherein the controller is further for, when an access to the specific application is restricted and the proximity touch input is received on the lock screen, controlling the touch screen to display a password input screen.

3. The mobile terminal of claim 1, wherein the controller is further for controlling the mobile terminal to exit the lock screen state and for controlling the touch screen to display information regarding a specific point of the preview image when the contact touch input through the specific point of the preview image is received.

4. A method of controlling a mobile terminal, the method comprising:
   generating and storing a preview image of a specific application executed before entering a lock screen state whenever an input for entering the lock screen state is received;
   controlling a touch screen to display a lock screen upon the mobile terminal entering the lock screen state;
   receiving a proximity touch input and a contact touch input via the displayed lock screen, wherein the proximity touch input is generated when an object approaches the touch screen without mechanical contact, and the contact touch input is generated when the object contacts the touch screen;
   controlling the touch screen to display, on the displayed lock screen, the stored preview image of the specific application executed before entering the lock screen state when the proximity touch input on the displayed lock screen is received, wherein the preview image of the specific application includes at least a portion of an execution screen of the specific application; and
   controlling the mobile terminal to exit the lock screen state and to execute the specific application when the contact touch input on the preview image is received,
   wherein the step of the generating comprises generating the preview image including a plurality of executing screens of multi-tasking applications when the mobile terminal is operating in a multi-tasking mode before entering into the lock screen state.

* * * * *